United States Patent Office 3,269,913
Patented August 30, 1966

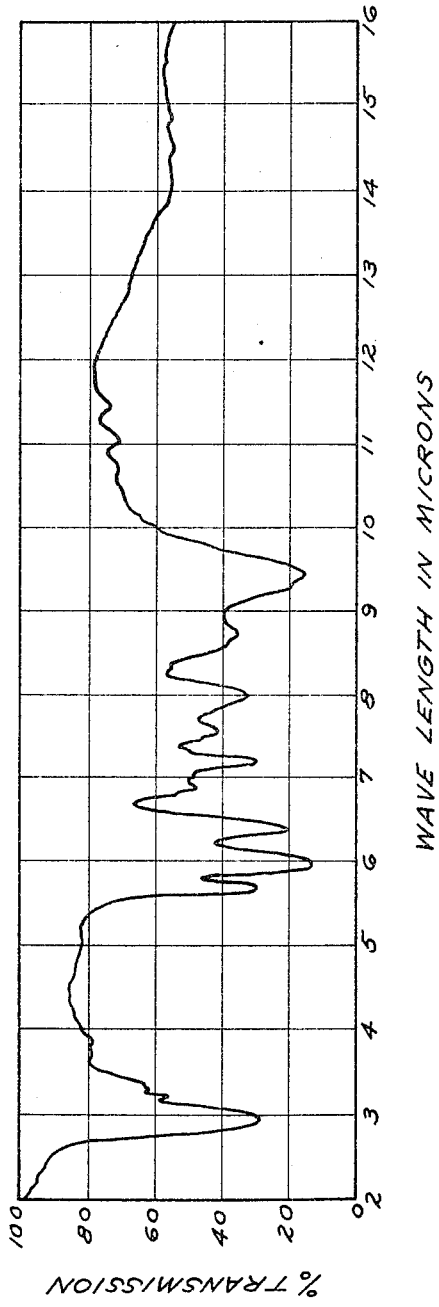

3,269,913
STAPHYLOCOCCAL-IMMUNIZING PRODUCTS AND METHODS FOR THEIR PRODUCTION
Henry B. Devlin, Grosse Pointe Park, Theodore H. Haskell, Ann Arbor, and Myron W. Fisher, Birmingham, Mich., assignors to Parke, Davis & Company, Detroit, Mich., a corporation of Michigan
Filed May 10, 1963, Ser. No. 279,577
Claims priority, application Philippines, May 11, 1962, 4,165; Canada, May 14, 1962, 849,093
23 Claims. (Cl. 167—78)

This is a continuation-in-part of application Serial No. 16,183, filed March 21, 1960, now abandoned, and a continuation-in-part of application Serial No. 109,978, filed May 15, 1961, now abandoned, which is a continuation-in-part of application Serial No. 16,184, filed March 21, 1960, now abandoned.

The present invention relates to staphylococcal immunizing products and methods for their production.

More specifically, the invention relates to new staphylococcus vaccine products, to polysaccharide compounds obtainable by chemical treatment of selected staphylococcal organisms, and to processes for the production of the foregoing vaccine products and polysaccharide compounds, said vaccine products and polyschardine compounds being capable of immunizing against staphylococcal infections.

For the past sixty years or so many attempts have been made to produce products capable of immunizing against staphylococcal infections. These products, some of which are commercially available, have produced equivocal, indifferent or disappointing results in humans. Today the problem of staphylococcal infections is even more serious than it has been for the past twenty-five years. This is particularly surprising since satisfactory immunizing agents have been successfully developed which protect against other bacterial infections such as typhoid, diphtheria, pertussis, tetanus, and pneumonia.

In carrying out the processes and producing the products of the invention, certain particular strains of *Staphylococcus aureus* are employed as starting materials. The particular strains of *Staphylococcus aureus* which can be used are those which have the morphological property of forming loosely cohesive, diffuse, semi-opaque colonies when grown in a semi-solid or soft agar culture medium containing plasma, serum or protein components thereof. This is a highly characteristic property as the great majority of strains of *Staphylococcus aureus* form dense, compact, opaque, cohesive colonies under the same growth conditions and are unsuitable as a source material in the processes of the invention. Some examples of individual strains of *Staphylococcus aureus* which can be used are the UC76, Smith, S193N4, H & D, Castellani, MCD138, SK4473, K6, K93 and K93M strains. Of these strains, the K93M, MCD138, S193N4 and UC76 strains are preferred. Each of these strains of *Staphylococcus aureus* has been deposited in the culture collection of Parke, Davis & Company at Detroit, Michigan, and in the culture collection of the Fermentation Laboratory, Northern Utilization Research and Development Division, U.S. Department of Agriculture at Peoria, Illinois, under the numbers shown in the following table.

| Strain | Parke, Davis & Co. Collection No. | Northern Utilization Research Laboratory Collection No. |
| --- | --- | --- |
| UC76 | 05068 | NRRL B-2467 |
| Smith | 05067 | NRRL B-2468 |
| S193N4 | 05089 | NRRL B-2469 |
| H & D | 05087 | NRRL B-2471 |
| Castellani | 05088 | NRRL B-2472 |
| MCD138 | 05085 | NRRL B-2473 |
| SK4473 | 05086 | NRRL B-2474 |
| K6 | 05090 | NRRL B-2475 |
| K93 | 05091 | NRRL B-2476 |
| K93M | 05092 | NRRL B-2477 |

The NRRL designations in the foregoing table represent microorganisms of the exemplified characteristics and not merely individual cultures maintained in a specific culture collection.

According to the present invention, it has been found that a unique staphylococcal vaccine produce can be prepared by extracting the intact cells of the aforementioned particular strains of *Staphylococcus aureus* with phenol and an aqueous solvent and separating the phenol and insoluble solid material from the aqueous solution. The two extractions can be carried out either simultaneously or, more preferably, the phenol extraction is carried out prior to the extraction with the aqueous solvent.

The intact cells of the aforementioned particular strains of *Staphylococcus aureus* used as the starting material can be either live (capable of reproducing), "killed" (incapable of reproducing) or a mixture of the two, that is, "partially killed." The precise method used to produce the "killed" or "partially killed" staphylococci is not critical. Some of the inactivation methods which can be used to produce satisfactory "killed' or partially killed" starting materials are heat (about 60° C. for one to one and a half hours), β-propiolactone (0.1 to 0.2% at 37° C. for two hours) and phenol (1% at 25° C. for about eighteen hours).

The aqueous solvent used for extraction purposes is preferably water although physiologically compatible aqueous salt solutions such as physiological saline, Hank's balanced salt solution and the like can also be used. The amount of aqueous solvent is not critical but it is preferable to use no more than is necessary to efficiently extract the desired antigen. If an excessive amount of the aqueous solvent is employed, the potency per milliliter of the final vaccine product will be undesirably low and necessitate the administration of an uncomfortably large volume of the vaccine. The amount of phenol used for extraction is likewise not critical. When both of the extractions are carried out simultaneously, sufficient phenol must be used to create a phenolic phase but insufficient to dissolve all the aqueous solvent present. When the phenol extraction is carried out prior to the extraction with the aqueous solvent it will be understood that the phenol phase must contain sufficient water to render the phenol liquid but insufficient to cause the separation of a separate aqueous phase, that is, between about 5 and 30 percent water. Since the intact cells of the staphylococci used as the starting material are moist and contain water, it is usually not necessary to add very much water to the phenol to liquefy it. The normal and preferred procedure is to employ phenol which finally contains not more than about 15 percent water. It appears that the phenol functions in a novel manner and not merely as a solvent for contaminant proteins. Examination of the phenolic phase reveals that it contains only a very small amount of protein and practically no antigenic material. This indicates that one of the functions of the phenol may be to break the cell wall and disrupt naturally occurring complexes or compounds in such a manner as to release the antigen for extraction by the aqueous solvent and simultaneously to denature most of the protein to a state that is not soluble in either the phenol or the aqueous solvent.

The final aqueous vaccine product should not contain substantially more than about 0.2% phenol. Any excess phenol which finds its way into the final product can be removed by dialysis or by extraction with a volatile, water-immiscible, organic solvent, such as ether or chloroform, followed by removal of any dissolved organic solvent from the aqueous solution in vacuo. Alternatively, when the two extractions of the process are performed in a non-simultaneous manner, the phenol can be eliminated during the processing. This is carried out as follows: The cells of the staphylococci are extracted with phenol and the phenol separated from the insoluble solids by centrifugation, filtration, decantation, etc. The insoluble solids are then washed with a volatile organic solvent for phenol, such as ether, chloroform, absolute ethanol, acetone and the like, and any volatile organic solvent which remains in the phenol insoluble solids after the washing allowed to evaporate prior to extracting the insoluble solids with the aqueous solvent.

Also in accordance with the invention, novel staphylococcal vaccine products can be prepared by reacting immunogenic protoplasmic material from the aforementioned particular strains of *Staphylococcus aureus* with an aqueous acid at a pH of approximately 4 or lower whereby an aqueous solution containing an immunizing antigen is obtained.

The immunogenic protoplasmic material employed as a starting material in this process can be the intact cells of the particular organisms or a cell fragment, constituent or alteration product having immunogenic properties. If the immunogenic protoplasmic material is the intact cells, they can be either live (capable of reproducing), "killed" (incapable of reproducing) or a mixture of the two. The precise method used to produce the "killed" or "partially killed" staphylococci is not critical. Some of the methods which can be used are heat (about 60° C. for one to one and a half hours), β-propiolactone (0.1 to 0.2% at 37° C. for two hours) and phenol (1% at 25° C. for about eighteen hours).

Other examples of immunogenic protoplasmic material employed as starting material in this process are immunogenic materials derived from the cells of the particular strains of *Staphylococcus aureus* by physical or chemical treatment which disrupts the cell without causing the immunogenic properties to be substantially lost. Some illustrations of such additional immunogenic protoplasmic materials suitable as starting materials in this process are the cellular debris resulting from mechanical disruption of the intact cells; the phenol-insoluble, water-insoluble solid material resulting from the extraction of the intact cells with phenol and an aqueous solvent; the water-soluble fraction resulting from the extraction of the intact cells with phenol and an anqueous solvent; and other cellular fragments and extracts of the particular strains of *Staphylococcus aureus*.

In carrying out this process, the treatment of the immunogenic protoplasmic material with an aqueous acid at a pH of approximately 4 or lower is conducted with any of a variety of organic or inorganic acids. Some examples of the many acids which can be used are aqueous acetic, formic, propionic, monochloroacetic, trichloroacetic and hydrochloric acids. However, the time and temperature of treatment with the aqueous acid are adjusted with respect to the particular strength of acid used so that the starting material is converted to a product of the desired antigenicity without excessive hydrolysis which causes a loss of potency. In general, when operating at a pH of 2–4, the suspension or solution of the starting material is heated whereas when operating at a pH below 2 and especially in the presence of mineral acids and other strong acids such as trichloroacetic acid, the treatment is preferably carried out at room temperature. Although brief treatment of pH's lower than 0 can be used, such conditions are not recommended because they cause further hydrolysis of the desired product. An example of a preferred acid is dilute acetic acid and typical operating conditions using this acid are to heat the suspension or solution of the starting material in 0.1-normal acetic acid for 5–60 minutes at 100° C., or under pressure at about 121° C., although a considerable variation from these specific reaction conditions affords satisfactory results. In large-scale work employing heat-killed cells as starting material, hydrolysis with 0.1-normal acetic acid is usually carried out for 10 minutes at 100° C.

Following the treatment with aqueous acid at a pH of approximately 4 or lower, the desired product is present in the aqueous solution. The aqueous solution is cooled if necessary and separated from any insoluble residue which may be present by centrifugation, filtration, decantation or similar means.

In the case of the vaccine product obtained by any of the foregoing procedures, the vaccine product is obtained in the form of an aqueous solution. The pH of the final vaccine product is adjusted, if necessary, to between about 6 and 8, preferably to approximately pH 7.2. If the vaccine is not isotonic, it is preferably made so by the addition of sodium chloride. The final vaccine product can be rendered sterile by various methods. For example, it can be sterilized by heat, ultraviolet irradiation, filtration or by addition of chemical preservatives. It is preferable to incorporate a preservative in the final vaccine. Some of the preservatives which can be used are thimerosal (1 to 10,000), benzethonium chloride (1 to 20,000) or phenol (0.2%).

The aqueous staphylococcal vaccine products produced by the foregoing processes are free from undissolved solids as well as from components of the culture medium used to produce the staphylococci. They are non-viable and contain very little nitrogen in comparison to the cells used as a starting material. They consistently produce, on parenteral administration, a high degree of immunity not only against infection by the strain of *Staphylococcus aureus* used in their preparation but also against infection by other strains of *Staphylococcus aureus*. The vaccine products are unique in that the amount of protective antibody which they cause to be produced can be measured in experimental animals and their efficacy in protecting against massive challenge doses of various strains of *Staphyococcus aureus* clearly demonstrated. The vaccine products produce no undesirable local or systemic reactions on administration.

Further in accordance with the invention, polysaccharides are obtained from the above described aqueous solutions and vaccine products by isolation and purification procedures. These polysaccharide compounds possess the immunizing properties of the aqueous solutions and vaccine products from which they are obtained. In addition, the polysaccharides are distinct chemical compounds capable of physical and chemical characterization. Because of their high potency, their reproducibility and their capability of being purified and standardized, the polysaccharides afford substantial advantages as immunizing agents.

The chemical nature of the antigenic substances present in intact living staphylococci is not known with certainty. However, those substances are believed to be proteinpolysaccharides or compounds of similar structure. By the present invention, those compounds are hydrolyzed by aqueous phenol or aqueous acids to yield polysaccharide products not chemically associated with proteins, nucleic acids, or phosphorylated groups.

For identification purposes in the development of the invention, the polysaccharide product obtained from the aqueous phase following phenol-water extraction as described above has been designated as polysaccharide I and the polysaccharide product obtained from the aqueous phase following acetic acid hydrolysis of the phenol-insoluble, water-insoluble cellular debris as described above has been designated as polysaccharide II.

The polysaccharide products of the invention (including polysaccharide I and polysaccharide II and other polysaccharide products of like structure but differing somewhat in degree of polymerization) are high molecular weight substances comprising many individual saccharide units. They contain carboxyl groups and, therefore, are capable of existing in a free acid form as well as many salt forms such as the sodium, potassium, calcium, magnesium, ammonium and amine salts, and mixtures thereof. The free acid forms and the simple salt forms have similar chemical, physical and biological properties, are readily interconvertible at proper pH conditions and, therefore, are considered as equivalent for the purposes of this invention. Except where otherwise specifically noted herein, a distinction is not made between the polysaccharide substances as free acids and as simple salt forms. Polysaccharides I and II can be regarded as members of a family of polydisperse, polycarboxylic polymers of a relatively small repeating carbohydrate unit. The members of this family show a marked similarity in physical, chemical, and biological properties. Within the family there is, of course, variation of those physical properties dependent upon molecular size as the degree of polymerization varies from member to member. There is, as well, a dependence of biological activity upon degree of polymerization as defined by such parameters as viscosity and ultracentrifugal sedimentation. Those members of the family having viscosity and sedimentation constants below a critical size show essentially no antigenic property but retain most of the other physical and chemical properties shown by the higher polymers. Except where otherwise indicated, the characterization of the polysaccharide substances applies generally to the members of the family. Variation of degree of polymerization is dependent upon the method of preparation of the particular sample.

The polysaccharides are obtained as crude solid substances by removal of the water from the aqueous solutions and vaccine products described above. Preferably the aqueous solutions and vaccine products, after dialysis, are frozen and then dried from the frozen state, thereby yielding a crude solid product having an ultraviolet absorption maximum at about 256–261 millimicrons due to the presence of nucleic acids as an impurity. The polysaccharides are purified by chromatography, by formation of an insoluble quaternary ammonium complex, by precipitation of impurities with an alcohol, especially a lower alkanol such as ethanol in the presence of salts such as sodium acetate or sodium sulfate, or by a combination of these methods.

For chromatographic purification, an aqueous solution of the polysaccharide is passed through a column of activated carbon and the product obtained by evaporation or lyophilization of the effluent.

For purification by formation of an insoluble quaternary ammonium complex, an aqueous solution of the polysaccharide is reacted with a long chain quaternary ammonium salt such as cetyl pyridinium chloride or cetyl trimethyl ammonium bromide. With proper control of the pH and ionic strength, an insoluble quaternary ammonium-polysaccharide complex separates; Glick, "Methods of Biochemical Analysis," volume 8, pages 145–197. The insoluble complex is then dissolved in calcium chloride solution and the polysaccharide is precipitated by the addition of ethanol. The product can then be reprecipitated as many times as desired by redissolving in water and adding ethanol. In carrying out a purification by formation of an insoluble quaternary ammonium-polysaccharide complex, it is advisable to remove nucleic acids first as the latter compounds under certain conditions will co-precipitate with acidic polysaccharides. Removal of nucleic acids can be accomplished by pretreating the polysaccharide solutions with neutralized diatomaceous earth or activated carbon until the product remaining shows little or no selective absorption in the ultraviolet.

For purification by precipitation of impurities with an alcohol, a quantity of alcohol is added sufficient to precipitate the bulk of the impurities without precipitating a substantial amount of the desired polysaccharide. For optimum results the concentrations of polysaccharide, added salts and alcohol must be carefully controlled. Satisfactory results are obtained by adding 5 to 10 volumes of absolute ethanol to a 0.15-molar sodium sulfate solution containing not more than about 5 mg./ml. of polysaccharide. The precipitated impurities are then removed by such means as filtration or centrifugation.

Following purification by chromatography, by quaternary ammonium complex formation, or by precipitation of impurities with an alcohol, the polysaccharide is normally present in a salt form in aqueous solution and is isolated as a purified white solid by dialysis of the solution and evaporation or lyophilization. The products obtained by lyophilization are partially hydrated and are normally used in this form for physical, chemical and biological measurements and applications. A more thoroughly dried product is obtained by drying at 50° C. and is normally used for elemental microanalyses and occasionally for other determinations. Physical and chemical data in this specification generally relate to lyophilized but not otherwise dried samples.

The characterization of the polysaccharides of the invention follows.

*General characterization.*—The polysaccharide substances of the invention are white, water-soluble compounds, heat stable and nondialyzable. They contain carboxyl groups and in free acid form they contain only the elements carbon, hydrogen, oxygen and nitrogen. The polysaccharides in free acid and simple salt forms are strongly levorotatory. The specific rotation values corresponding to the free acid forms, dried to constant weight at 50° C., were determined to be as follows in aqueous solution: polysaccharide I, $[\alpha]_D^{23} = -86.5°$; polysaccharide II, $[\alpha]_D^{23} = -79.4°$. These values do not differ from each other or from specific rotation values determined for other polysaccharides of the invention by more than the experimental variation in the measurements. By microanalyses of dried samples and equivalent weight measurements, the empirical formula of the free acid forms is determined as $C_{19}H_{33}N_3O_{13}$. The polysaccharides of the invention are polymeric in nature and of very high molecular weight, substantially in excess of 100,000.

*Spectroscopic characterization.*—The drawing shows the infrared absorption spectrum of the polysaccharides of the invention, free acid form, in a potassium bromide disk, as determined with a sample of the substance designated polysaccharide II. Infrared absorption maxima appear at 2.95, 3.22, 3.33, 3.37, 5.73, 6.00, 6.43, 6.96, 7.24, 7.61, 8.04, 8.77, 9.49, 10.83, 11.13 and 11.52 microns. The various polysaccharides of the invention in free acid form have a substantially identical infrared absorption spectrum. The salt forms also have characteristic absorption spectra as described in the experimental section.

The polysaccharide substances of the invention have no selective absorption in the ultraviolet, being essentially transparent down to a wave length of about 240 millimicrons. However, measurements of ultraviolet absorption are useful in determining the presence of impurities such as nucleic acids which have characteristic absorption in the ultraviolet.

*Chemical behavior.*—The polysaccharide substances of the invention give negative Molisch and anthrone tests, indicating that common hexoses and pentoses are not present. Tests for sialic and common uronic acids are negative. Following hydrolysis, a positive Elson-Morgan test is obtained, indicating that the hydrolysis product contains one or more aminosaccharides. By heating with diphenylamine in acetic acid - sulfuric acid mixtures (Dische's test), a product having a blue color is obtained, absorption maximum at 575 millimicrons. The sensitivity of this test is comparatively low and impurities may interfere. By heating in 79% sulfuric acid at 100° C. for 15 minutes, a solution having a single ultraviolet absorption maximum at 290 millimicrons is produced.

The polysaccharides of the invention show no significant uptake of periodate under standard conditions, indicating a highly substituted structure.

By reaction with dilute methanolic hydrogen chloride or diazomethane, the carboxyl group is converted to a methyl ester. The methyl ester grouping is converted to an alcohol by reduction with sodium borohydride in sodium bicarbonate solution.

Quantitative O-acetyl determinations show the presence of 6 to 8% acetyl groups bonded to oxygen. The acetoxyl groups are hydrolyzed with 0.1 normal sodium hydroxide solution at room temperature.

Extensive structure determination studies based on the investigation of the hydrolysis products of polysaccharides II and its derivatives have shown that the polysaccharides of the invention can be chemically described as polymers of D-glucosaminuronic acid amide linked L-alanine (probably N-acetylated as free amino groups are not present) and containing from 6 to 8% acetyl bonded to oxygen. Products identifiable upon the hydrolysis of the polysaccharide with mineral acids are alanine, ammonium chloride and D-glucosaminuronic acid. The presence of D-glucosaminuronic acid units is a highly characteristic structural feature. D-glucosaminuronic acid does not belong to the group of common uronic acids which give positive tests with the standard uronic acid colorimetric assay methods.

Further structure determination studies indicate that the intact polysaccharide contains 9–11% of L-alanine by weight. Esterification of carboxyl groups, reduction and acid hydrolysis indicate an alanine:glucosamine ratio of 1 mole:2 moles. It therefore appears that the polysaccharides of the invention consist of units of N-(N-acetyl-L-alanyl)-D-glucosaminuronic acid and N-acetyl-D-glucosaminuronic acid linked in a β 1→4 type glycosidic manner, one of the units being O-acetylated at the C–3 position. The polysaccharide gives a negligible reducing value by the dinitrosalicylic acid method.

*Colorimetric assay.*—The polysaccharide substances of the invention develop a yellow color in acetic acid-sulfuric acid solution which can be used for quantitative determinations. 2 ml. of aqueous polysaccharide solution is added to 4 ml. of glacial acetic acid containing 10% sulfuric acid and the mixture is heated in a boiling water bath for 30 minutes. Upon cooling the solution has absorption maxima at 283, 410 and 470 millimicrons. Most common sugars interfere with readings in the 283 millimicron region, but the absorption peaks at 410 and 470 millimicrons are quite specific for the polysaccharides of the invention. By comparison of optical density readings at either 410 or 470 millimicrons, the purity of an unknown polysaccharide sample can be compared with a purified or standardized sample. This method can be employed as a means of quantitative analysis.

*Electrophoretic behavior.*—The polysaccharide substances can be detected and their electrophoretic mobility can be studied on glass fibre strips. When 50 to 100 micrograms of polysaccharide is applied to such strips and subjected to electrophoresis, the polysaccharide can be detected by spraying the strips with a solution containing 1% p-anisidine in wet butanol containing 2% concentrated sulfuric acid and heating at 100° C. for 10 to 15 minutes. The polysaccharide appears as a pink spot against a colorless background. The polysaccharide moves as an anion toward the anode or positive pole at pH values of 4 and above. Good resolution is obtained with 0.05-molar phosphate buffer at pH 6.0 and 0.05-molar borate buffer at pH 8.6 at high voltage (300 volts) and low amperage (less than 20 milliamperes). At pH values between 3 and 4, the polysaccharide moves by endosmosis, as an uncharged particle.

The electrophoretic behavior of polysaccharide II (as mixed calcium-sodium salt) was determined in a Tiselius electrophoretic apparatus and the following electrophoretic mobility constants were determined:

at pH 4.4, $6.3 \times 10^{-5}$ cm.$^2$ sec.$^{-1}$ volt$^{-1}$;
at pH 6.0, $5.87 \times 10^{-5}$ cm.$^2$ sec.$^{-1}$ volt$^{-1}$;
at pH 7.5, $5.83 \times 10^{-5}$ cm.$^2$ sec.$^{-1}$ volt$^{-1}$.

*Special physicochemical characterization.*—Polysaccharide solutions at several different concentrations in 0.1-molar phosphate buffer at pH 7.0 are sedimented in an analytical ultracentrifuge and an observed sedimentation coefficient, $S_{ob}$, is determined for each concentration. By appropriate corrections for temperature and viscosity, each $S_{ob}$ value is converted to the sedimentation coefficient, $S_{20}^w$, at the same concentration in water at 20° C. The values are plotted on a graph having the concentration in mg./ml. along the abscissa and $S_{20}^w$ values along the ordinate. A straight line is fitted to the individual points by the method of least squares and extended to intercept the ordinate. The $S_{20}^w$ value at the intercept point is the sedimentation coefficient of the polysaccharide at infinite dilution in water at 20° C., $S_{20}^w$, ∞.

The partial specific volume of the polysaccharide, $\overline{V}$, is determined from the densities of various solutions of known concentrations of the polysaccharide. $\overline{V}$ can be considered as equal to $1/d$, where $d$ is the dry weight density of the solute in g./ml.

The intrinsic viscosity $[\eta]$ is a useful physical constant of the polysaccharide compounds of the invention and is directly related to the molecular weight. The intrinsic viscosity $[\eta]$ is defined as the limit as the concentration approaches zero of $$\frac{(\eta/\eta_0)-1}{c}$$

where $\eta$(eta) is the solution viscosity in poises, $\eta_0$ is the solvent viscosity in poises and $c$ is the concentration of solute polysaccharide in g./100 ml. The value for $[\eta]$ is determined from solvent and solution viscosities measured at a series of different solute concentrations by plotting the values and fitting a straight line by the method of least squares.

The polysaccharide compounds of the invention have intrinsic viscosities, measured at 25° C. in 0.1 M phosphate buffer at pH 7, between 0.3 and 3.5, corresponding to molecular weights substantially in excess of 100,000. Polysaccharides of similar structure but having an intrinsic viscosity below 0.3 and a correspondingly lower molecular weight do not possess the high immunogenic activity of the polysaccharides of the invention.

The intrinsic viscosity and state of polymerization can be varied by controlling the reaction conditions under which hydrolysis is carried out. The effect of reaction conditions can be illustrated by the following measurements made on representative preparations:

Polysaccharide prepared by treatment of killed cells with 5% aqueous trichloroacetic acid, room temperature for 24 hours: $S_{20}^w$, ∞, 1.716; apparent partial specific volume 0.561; $[\eta]=2.96$ in 0.1 M phosphate buffer, pH 7.0, at 30° C.

Polysaccharide prepared by phenol-water extraction: $S_{20}^w$, ∞, 1.625; apparent partial specific volume 0.555; $[\eta]=1.81$ in 0.1 M phosphate buffer, pH 7.0, at 30° C.

Polysaccharide prepared by treatment of killed cells with 0.1 N acetic acid, 10 minutes at 100° C.: $S_{20}^w$, ∞, 1.56; $[\eta]=1.37$ in 0.1 M phosphate buffer, pH 7.0, at 30° C.

Polysaccharide prepared by treatment of killed cells with 0.1 N acetic acid, 90 minutes at 100° C.: $S_{20}^w$, ∞, 0.67; apparent partial specific volume 0.5296; $[\eta]=0.33$ in 0.1 M phosphate buffer, pH 7.0, at 30° C.

The sample showing intrinsic viscosity of 0.33 at 30° C. has substantially lower antigenic potency than the preceding samples and represents a polysaccharide of the invention near the lower limit of molecular size.

The relationship between intrinsic viscosity and molecular weight can be represented by the equation $[\eta]=KM^a$ where "K" and "a" are constants characteristic of the type of polymer.

The intrinsic viscosity of the polysaccharides of the invention varies somewhat with temperature. For example, polysaccharide II in 0.1 M phosphate buffer at pH 7.0 has intrinsic viscosity values of approximately 1.8, 1.6, and 1.4 at 20° C., 25° C., and 30° C. respectively.

In the foregoing discussion $S_{20}^w$, ∞ is in Svedberg units, $\overline{V}$ is in ml./g., $[\eta]$ is in 100 ml./g., and M is in molecular weight units.

Evidence indicates that the polysaccharides of the invention possess a threadlike molecular configuration which assumes the shape of a random coil in aqueous solution. It is the nature of such particles to have associated with them a very large domain (of the order of several hundred times the particle weight) of water.

The polysaccharide substances of the invention can also be characterized by conventional viscosity measurements. At 23° C. the viscosity of polysaccharide I, free acid form, is determined to be 0.0198 poise (0.3166% in water); the viscosity of polysaccharide II, free acid form, is determined to be 0.0151 poise (0.3% in water). The corresponding value for the viscosity of pure water at 23° C. is 0.00938 poise.

*Bioassay.*—An immunological unit of potency has been established and is of value in laboratory assays of crude and purified polysaccharide preparations as well as the aqueous solutions from which they are derived. For crude preparations the unit of potency, designated as a mouse protective unit, is the quantity of material capable of protecting 50% of a group of mice against a challenge by 10,000 times the amount of staphylococci capable of killing 50% of a group of normal control mice. The immunogenic substance is administered subcutaneously seven days before challenge and the challenge is by intraperitoneal administration of staphylococci in mucin. In the standard assay, the UC76 strain of *Staphylococcus aureus* is used for challenge. The potency of a purified preparation can be expressed as the number of mouse protective units per milligram or per milliliter of solution, or, preferably, as the 50% protective dose (PD50) as micrograms per kilogram in mice against a 10,000 LD50 (50% lethal dose) challenge. Purified preparations of the polysaccharides of the invention are found to provide a PD50 of approximately 0.175 microgram per kilogram. In judging purity from immunological assay the usual allowance must be made for experimental error in biological measurements. The determination of potency and purity by this bioassay corresponds well with the colorimetric assay previously described, except when the polysaccharide has been hydrolyzed to too small a molecular size.

The polysaccharide compounds of the invention are capable of stimulating the formation of a protective antibody and, on parenteral administration, produce a high degree of immunity not only against infection by the strain of *Staphylococcus aureus* used in their preparation but also against infection by other strains of *Staphylococcus aureus*. Because they can be purified and accurately characterized and standardized, they have high reproducibility in chemical composition and in clinical effect.

Still further in accordance with the invention, it has been found that unique staphylococcal vaccines can be produced by subjecting intact live cells of the aforementioned particular strains of *Staphylococcus aureus* to the action of heat. The staphylococcal vaccines prepared in accordance with this process consistently produce, upon parenteral administration, a degree of immunity not only against infection by the strain of *Staphylococcus aureus* used in the preparation of the vaccine but also against infection by other strains of *Staphylococcus aureus*. These vaccines cause the formation of a protective antibody which can be measured in experimental animals and which is effective in protecting against massive challenge doses of various strains of *Staphylococcus aureus*.

In accordance with this process staphylococcal vaccines possessing the properties enumerated above are produced by heating a suspension of intact live cells of the aforementioned particular strains of *Staphylococcus aureus* in a sterile aqueous medium at 55 to 80° C. under aseptic conditions until the suspension is either sterile or substantially sterile, that is, capable of being rendered sterile by the preservative added to the vaccine. Usually about one to one and one half hours heating is sufficient and optimal although longer heating periods and higher temperatures (up to about 120° C.) can be used if desired without undue deleterious effect upon the potency of the vaccine. A preservative is preferably added to the final fluid vaccine suspension. Suitable preservatives are phenol, thimerosal, and benzethonium chloride which can be used in concentrations of about 0.2%, 1 to 10,000 and 1 to 20,000, respectively. In carrying out the process the most convenient aqueous medium in which to suspend the cells is sterile isotonic saline solution although other aqueous media such as sterile water, sterile Hank's balanced salt solution and the like can also be used. The aqueous medium is preferably substantially neutral, that is, has a pH greater than 6.0 and less than 8.0, and is substantially free from proteinaceous growth medium constituents. The concentration of the cells in the suspension is not critical but it should be sufficiently high to produce a vaccine having a relatively high potency. If too low a concentration is used, the volume of vaccine which must be administered is uncomfortably large. For most purposes, a suspension containing about one to four billion intact cells per ml. is preferred. Optimal results are obtained by the use of a temperature of about 60° C. and heating the suspension for about one hour after the suspension first reaches this temperature. The vaccines prepared from the intact cells of the K93M, MCD 138, S193N4 and UC76 strains of *Staphylococcus aureus* produce the highest degree of immunity and hence these strains are the preferred strains for use in the practice of the invention. In carrying out this process it is important that the cells of the staphylococci remain intact since vaccines prepared by disintegration of the live cells or vaccines in which a high proportion of the cells are ruptured after the killing treatment produce sensitivity reactions which seriously restrict or preclude their use for immunization purposes.

The invention is illustrated by the following examples.

*Example 1*

250 ml. of a sterile culture broth having the following composition:

| | G. |
|---|---|
| Peptone derived from casein by pancreatic digestion (Trypticase) | 17.0 |
| Papaic digest of soya meal (Phytone) | 3.0 |
| Sodium chloride | 5.0 |
| Dipotassium phosphate | 2.5 |
| Dextrose | 2.5 |
| Water | 1000.0 | in a 500 ml. flask was seeded with one loopful of a stock culture of the UC76 strain of *Staphylococcus aureus* and the culture incubated at 37° C. under aseptic conditions for six hours. A 30 ml. portion of this six-hour culture of *Staphylococcus aureus* UC76 was added to each of three 6 liter flasks containing three liters of the above described sterile culture broth and the seeded cultures incubated at 37° C. under aseptic conditions for twenty-four hours. 30 ml. of 30% aqueous phenol was added to each of the cultures to reduce the viability of the staphylococci and the cultures allowed to stand at room temperature for sixteen to eighteen hours. The cultures were pooled. A 10. ml. sample was removed and found to still contain live staphylococci. The pooled culture was cooled to $+4$ to $+10°$ C. and centrifuged in a sharples centrifuge at a flow rate of 225 ml. per minute and 25,000 r.p.m. The wet packed cells were removed from the centrifuge and weighed; 8.2 g. or approximately $3.43 \times 10^{12}$ organisms. A small sample (0.2753 g.) of the wet cells which had been removed previously was dried overnight in an oven at 105° C. to determine the water present in the wet cell mass. The dry cell weight was determined to be 27.8% of the wet cell weight.

The 8.2 g. of wet cells of the UC76 strain of *Staphylococcus aureus* were placed in a Waring blendor and 50 g. of crystalline phenol and 10 ml. of water added. The phenol liquefied. The mixture was mixed at room temperature for ten minutes. The final temperature of the muddy gray colored mixture was 41° C. On standing the mixture failed to separate. The mixture (volume 59 ml.) was cooled to $+10°$ C. and centrifuged for sixty minutes at 4000 r.p.m. The centrifuged mixture was composed of two layers, a dark amber supernatant and a gray, tightly packed precipitate. The supernatant (51 ml.) was separated and discarded. 60 ml. of 83% phenol (50 g. of phenol and 16 ml. of water) was added to the gray precipitate and the mixture mixed for one minute in a Waring Blendor to obtain a light gray suspension having a volume of 61 ml. The suspension was centrifuged at $+10°$ C. for sixty minutes at 4000 r.p.m. and the supernatant (54 ml.) separated from the precipitate and discarded. The precipitate was suspended in 25 ml. of distilled water and the suspension dialyzed at $+4°$ C. against running tap water. During the dialysis the dialysis sack was kept in motion. The dialysis against running tap water was carried out for about three days. The dialysis sack was placed in static distilled water at $+4°$ C. and the dialysis continued for about twenty-four hours with one change of distilled water. The suspension was transferred from the dialysis sack to a graduate and the sack rinsed with 1 ml. of distilled water. The rinse was added to the suspension; total volume 31 ml.; pH 5.9. The suspension was transferred to a 50 ml. bottle and the graduate washed with 1 ml. of distilled water. The wash water was added to the suspension and mixture frozen. The mixture was thrawed (volume 28 ml.), the pH adjusted from 6.0 to 7.5 by the addition of 3 drops of 1 N sodium hydroxide solution and 3 drops of 0.1 N sodium hydroxide solution. The mixture was shaken vigorously by hand, centrifuged for two hours at $+4$ to $+10°$ C. at $7710 \times G$ and for an additional one and a half hours at $12,100 \times G$. A very slight turbidity still remained in the supernatant. The aqueous supernatant which consisted of the desired vaccine product was separated from the precipitate; volume 21 ml.; pH 7.7. Assay of this vaccine product for immunogenic activity against the UC76 strain of *Staphylococcus aureus* in Carworth Farms No. 1 mice showed the product to have a potency of 15,500 mouse protective units per milliliter against a 10,000 LD50 challenge. This assay was carried out as described below.

105 Carworth Farms No. 1 albino mice (18 to 22 g.) were divided, for inoculation purposes, into seven groups of fifteen mice each. The mice in each of the groups were inoculated subcutaneously with 0.2 ml. of varying sterile physiological saline dilutions of the vaccine. The dilutions of vaccine used for each of the groups was as follows:

Group 1—0.2 ml. of a 1 to 100 dilution
Group 2—0.2 ml. of a 1 to 300 dilution
Group 3—0.2 ml. of a 1 to 1000 dilution
Group 4—0.2 ml. of a 1 to 3000 dilution
Group 5—0.2 ml. of a 1 to 10,000 dilution
Group 6—0.2 ml. of a 1 to 30,000 dilution
Group 7—0.2 ml. of a 1 to 100,000 dilution Seven days later the mice in each of the groups, as well as thirty mice in a control group, were each challenged by intraperitoneal injection of 10,000 LD50 of the UC76 strain of *Staphylococcus aureus* (0.5 ml. of a 1 to 100,000 dilution of a six hour culture of *Staphylococcus aureus* UC76 in the broth medium described above). The mice were observed for five days and the deaths recorded. The percentage of survivors in each group was calculated and from these survival figures the protective dilution for 50 percent of the mice (PD50) was calculated by the method of Miller and Tainter, Proc. Soc. Exp. Biol. Med. 57, 264 et seq. (1944). The survival data for this assay is shown in the following table.

| Group | Dilution of 0.2 ml. of vaccine used | Deaths on days after challenge | | | | | Percent Survivors |
|---|---|---|---|---|---|---|---|
| | | 0 | 1 | 2 | 3 | 4 | |
| Control | Not treated | 0 | 30 | 0 | 0 | 0 | 0 |
| 1 | 1–100 | 0 | 0 | 0 | 0 | 0 | 100 |
| 2 | 1–300 | 0 | 0 | 0 | 0 | 0 | 100 |
| 3 | 1–1,000 | 0 | 0 | 1 | 0 | 0 | 93.3 |
| 4 | 1–3,000 | 0 | 4 | 3 | 0 | 0 | 53.3 |
| 5 | 1–10,000 | 0 | 15 | 0 | 0 | 0 | 0 |
| 6 | 1–30,000 | 0 | 15 | 0 | 0 | 0 | 0 |
| 7 | 1–100,000 | 0 | 15 | 0 | 0 | 0 | 0 |

From the above table it will be seen that the control mice all died within about twenty-four hours and that slightly more than 50% of the mice were protected by 0.2 ml. of the vaccine diluted from 1 to 3000. The actual PD50 of the vaccine was calculated from these data to be 3100 per 0.2 ml. or 15,500 mouse protective units per ml.

The dialysis step in the above procedure can be eliminated by washing the phenol insoluble precipitate with ether and allowing any ether present in the solid to evaporate before carring out the extraction with water.

*Example 2*

10 test tubes containing 10 ml. of a sterile culture broth having the same composition as that described in Example 1 were each seeded with one loopful of a stock culture of the UC76 strain of *Staphylococcus aureus* and incubated at 37° C. under aseptic conditions for six hours. 2 ml. portions of these living cultures were used to seed each of 43 Roux flasks each containing 200 ml. of a sterile solid cultiure medium having the following composition:

|  | G. |
|---|---|
| Peptone derived from casein by pancreatic digestion (Trypticase) | 15.0 |
| Papaic digest of soya meal (Phytone) | 5.0 |
| Sodium chloride | 5.0 |
| Agar | 15.0 |
| Distilled water | 1000.0 |

The seeded cultures were incubated at 37° C. under aseptic conditions for eighteen hours. The living *Staphylococcus aureus* UC76 were washed from the surface of the forty-three cultures with the minimum amount of sterile physiological saline and the resulting suspension centrifuged for one hour at 4000 r.p.m. The supernatant was discarded and the packed cells [40.1 g. (wet weight) (approximately $1.8 \times 10^{13}$ organisms)] were suspended in 219 ml. of distilled water; volume of suspension 245 ml. A 9 ml. sample was removed and the remaining 236 ml. of the suspension divided into two equal portions. Each 118 ml. portion of the aqueous suspension of live *Staphylococcus aureus* UC76 cells was mixed with 256.3 g. of phenol and 156 ml. of water in a Waring blendor for eight minutes. The temperature rose from 15° C. to 36° C. The resulting mixtures were combined and cooled to 10° C.; volume 800 ml. Two layers formed. The mixture was centrifuged at $+10°$ C. for sixty minutes at 4000 r.p.m. which caused the separation of four phases; an aqueous phase at the top, an interface precipitate phase below the aqueous phase, a phenol phase below the interface precipitate phase and a precipitate phase below the phenol phase. The aqueous phase was siphoned off and stored at +4° C. The phenol phase was siphoned off and discarded. The interface precipitate phase was combined with the precipitate phase and diluted with the 10 ml. of distilled water which was used to rinse the vessels during the transfer. The combined precipitates and wash water were mixed with the aqueous phase and the resulting suspension centrifuged at 4000 r.p.m. for two hours. The aqueous phase (volume 400 ml.) was separated and dialyzed against running tap water at +4° C. During the dialysis the dialysis sack was kept in motion. Dialysis against running tap water was continued for about two days. The dialysis sack was then transferred to static distilled water at +4° C. and the dialysis continued for about two days with one change of the distilled water. The dialyzed material which had a volume of 450 ml. was clear and colorless. 3.825 g. of sodium chloride was added to the aqueous vaccine to render it physiological and the pH adjusted from 6.9 to 7.2 by the addition of 0.15 ml. of 0.1 N sodium hydroxide solution. The vaccine was transferred to a sterile 500 ml. bottle, thimerosal added to a concentration of 1 to 10,000 and the vaccine stored overnight at room temperature. A 30 ml. sample was removed for sterility testing and assay for immunogenic activity by the procedure described in Example 1. The balance of the vaccine was stored at +4° C. and after final sterility, safety and potency tests filled into rubber capped bottles containing 10.5 ml. each. The sterility tests in liquid thioglycollic acid medium showed the vaccine to be sterile. Immunogenic assay by the method described in Example 1 showed the vaccine to have a potency of 975 mouse protective units per milliliter against a 10,000 LD50 challenge with the UC76 strain of *Staphylococcus aureus*.

If desired, the dialysis step in the above procedure can be eliminated by extracting the aqueous phase (400 ml. volume) with several portions of ether and then freeing the aqueous solution of dissolved ether by evaporation in vacuo.

Vaccine products similar to those described in Examples 1 and 2 can be prepared by substituting any one of the following strains of *Staphylococcus aureus* for the UC76 strain of *Staphylococcus aureus* used to inoculate the nutrient media as described in the aforementioned examples: Smith, S193N4, H and D, Castellani, MCD 138, SK4473, K6, K93 and K93M.

Example 3

A stock culture of the UC76 strain of *Staphylococcus aureus* is maintained on a culture medium having the the following composition:

Ingredient: Quantity, g.
Peptone derived from casein by pancreatic digestion (Trypticase) _____ 17.0
Papaic digest of soya meal (Phytone) _____ 3.0
Sodium chloride _____ 5.0
Dipotassium phosphate _____ 2.5
Dextrose _____ 2.5
Distilled water, 1000.0 ml.

For use, this medium is sterilized by autoclaving at 118–121° C. for 15 minutes. The organism is cultured for 18–24 hours at 35–37° C. and maintained on the same medium by transfer once every week.

Seed cultures are prepared by inoculating large test tubes containing 30 ml. of the above culture medium with approximately 0.3 ml. of the stock culture and incubating at 35–37° C. for 6–24 hours. One tube of seed culture is prepared for each final production flask. A series of final production flasks is prepared, each containing 1,000 ml. of the sterilized medium described above. Each flask is inoculated with 30 ml. of the 6–24 hour culture and incubated at 35–37° C. for 24 hours. Phenol (purified grade) is added to give a concentration of 1% (weight/volume) and, after mixing, the culture is left at room temperature overnight for inactivation. The cell suspension is then centrifuged in a laboratory model air turbine Sharples centrifuge at room temperature at a flow rate of approximately 250 ml. per minute. The packed cells are removed, resuspended in $\frac{1}{10}$ the original culture volume of 0.85% saline in a Waring blendor, and again collected by centrifugation. The number of cells obtained is calculated from the conversion factor that 2.4 g. of wet packed cells as obtained by centrifugation equals approximately $1 \times 10^{12}$ organisms. The dry cell weight is approximately 28% of the wet cell weight.

Phenol containing a measured small amount of water to render it liquid is added to the cell mass, using 9 ml. of phenol for each $1 \times 10^{12}$ cells. The solid is suspended and by further addition of phenol or water the suspension is brought to a volume of 10.58 ml. for each $1 \times 10^{12}$ cells and a phenol concentration of $85 \pm 1\%$ (volume/volume) by calculation. The cell-phenol suspension is brought to a temperature of $24 \pm 2°$ C. and blended in a Waring blendor for 8–10 minutes, the temperature being maintained at or below about 50° C. The emulsion obtained in this operation is centrifuged in portions at 2500 r.p.m. at room temperature for 30–60 minutes. The clear supernatant liquid is discarded and the solid pellets are resuspended in 85% (volume/volume) phenol by blending for 1–2 minutes in a Waring blendor, using 10 ml. of 85% phenol for each $1 \times 10^{12}$ of the original cells. The cell mass is again collected by centrifugation and the supernatant liquid discarded. The cell mass is resuspended in distilled water to give a volume of 5.0–5.5 ml. for each $1 \times 10^{12}$ of orogonal cells, and the suspension is dialyzed for 24–48 hours against cold running tap water and then overnight against a fixed volume of distilled water at approximately 4° C. If necessary, dialysis is repeated until the ferric chloride test for phenol is negative. The suspension is adjusted to pH $7.4 \pm 0.2$ with 0.1-normal sodium hydroxide and centrifuged at room temperature. The aqueous and solid phases are separated and both are retained. The solid pellet is resuspended in distilled water to give a volume of 0.25 to 0.30 ml. for every $1 \times 10^{12}$ of original cells and, after thorough mixing, the suspension is centrifuged. The aqueous supernatant solutions are combined and can be used in the isolation of polysaccharide I. The solid pellet can be used in the preparation of polysaccharide II by reaction with acetic acid.

Polysaccharide I is obtained in the following manner. An aqueous solution (6.5 liters, combined from a number of batches) resulting from phenol-water extraction of the UC76 strain of *Staphylococcus aureus* as described above is concentrated in a circulating evaporator at a temperature of less than 30° C. to a volume of about 500 ml. The solution is then dialyzed overnight against deionized water and the bag contents dried from the frozen state. At this point the product has an ultraviolet absorption maximum at 256 millimicrons in water $$E_{1\,cm.}^{1\%} = 70$$

indicating a nuclei acid content of about 30%. The product assays for 63,000 mouse protective units per milligram. In order to remove the nuclei acids, the product after dialysis (1.2 g.) is dissolved in 50 ml. of 0.45-molar sodium sulfate and the solution is diluted with 40 ml. of water, adjusted to pH 6.1 with sodium hydroxide and diluted with additional water to a volume of 100 ml. With stirring, a solution of 0.09 g. of cetyl pyridinium chloride in 50 ml. of water is added and after 1 hour the solution is filtered through a pad of diatomaceous earth and combined with a 15 ml. washing of 0.15-molar sodium sulfate solution. The combined filtrate and washing is lyophilized and the dried solid is dissolved in 20 ml. of water. Ethanol (100 ml.) is added with stirring and the mixture is centrifuged at 1000 r.p.m. for 30 minutes. The cloudy supernatant liquid is separated by decantation and the residue is washed with ethanol and centrifuged. The residue at this point is designated as fraction A and the supernatant liquids are combined and designated as fraction B. Fraction A is dissolved in water and the solution dialyzed, filtered and lyophilized to afford 373 mg. of a solid product containing 5.3% polysaccharide by colorimetric assay. Fraction B is diluted with an equal volume of absolute ethanol and a glatinous precipitate which forms is collected by centrifugation, washed several times with absolute ethanol, and dissolved in water. This aqueous solution is dialyzed overnight and dried from the frozen state to give 254 milligrams of a solid product containing 69% polysaccharide by colorimetric assay, and assaying for 228,000 mouse protective units per milligram.

Further purification of polysaccharide I can be carried out by carbon chromatography. The solid product from fraction B is dissolved in 35 ml. of water. The solution is adjusted to pH 4.5 with acetic acid, filtered through diatomaceous earth and the filtrate passed through a chromatography column prepared from 1 g. of activated carbon and 1 g. of diatomaceous earth. Materials such as Darco G–60 and Celite 545 can be used. The column is washed with a small amount of water and the combined effluent and wash are dialyzed overnight, filtered through diatomaceous earth and lyophilized to give 132 milligrams of a solid product containing 87% polysaccharide by colorimetric assay.

Still further purification of polysaccharide I can be carried out via formation of an isoluble quaternary ammonium complex. A portion of the product obtained after carbon chromatography (58 mg.) is dissolved in 4.5 ml. of water and the pH adjusted to 5.6 with base. To this solution is added 0.53 ml. of 1-molar sodium chloride followed by 0.75 ml. of an aqueous solution containing 84 mg. of cetyl pyridinium chloride. The solution is diluted to a volume of 8.3 ml. with water and after 1 hour the insoluble product is collected by centrifugation and washed with 1 ml. of water. The product is then dissolved in 2 ml. of 0.5-molar calcium chloride solution and filtered through a pad of diatomaceous earth. Absolute ethanol (12 ml.) is slowly added to the filtrate with stirring and the precipitate which forms is collected in a centrifuge and washed twice with ethanol. The product is re-precipitated two more times by dissolving in a small amount of water and adding ethanol. After a final washing with ethanol, it is dissolved in water and the solution is dialyzed against distilled water and lyophilized to give 43 mg. of polysaccharide I (calcium salt); $[\alpha]_D^{23} = -83.8°$ (0.5% in water), or $[\alpha]_D^{23} = -94°$ calculated for anhydrous form after volatile loss of 10.94% at 50° C. The dried product assays for: 42.21% carbon, 6.76% hydrogen, 8.02% nitrogen and 5.71% ash. Recomputed to an ash free basis the values are 44.5% carbon, 7.1% hydrogen and 8.48% nitrogen. The viscosity is 0.026 poises (0.316% in water). In a potassium bromide disk infrared absorption maxima appear at about 2.94, 3.22, 3.40, 5.78, 6.06, 6.42, 6.68, 7.07, 7.26, 7.65, 8.02, 8.80, 9.50, 10.70, 11.10 and 11.57 microns.

Polysaccharide II is prepared in the following manner. The washed solid product resulting from phenol-water extraction of the UC76 strain of Staphylococcus aureus as described above is suspended in distilled water to give a volume of 5.0 ml. for each $1 \times 10^{12}$ of original cells. Sufficient 10-normal acetic acid is added to give a final concentration of 0.1-normal acetic acid, and pH at this point being about $3.4 \pm 0.3$. The suspension is mixed thoroughly and autoclaved for 5 minutes at 121° C. The suspension is cooled to room temperature and centrifuged. The desired product appears in the aqueous supernatant liquid at this point. The solid precipitate is resuspended in 0.1-normal acetic acid, to give a volume of 0.5 ml. for each $1 \times 10^{12}$ of original cells. This suspension is centrifuged, the aqueous supernatant liquid combined with that obtained in the previous centrifugation and the precipitate discarded. The aqueous solution is adjusted to a pH of $7.4 \pm 0.2$ with sodium hydroxide. If the product is desired for use in this form, a preservative such as thimerosal (1:10,000) or benzethonium chloride (1:20,000) is added and the solution is sterilized and clarified by filtration. In order to isolate the solid polysaccharide II, the aqueous solution having pH adjusted to $7.4 \pm 0.2$ is dialyzed against running tap water for 3 days and against ten times its volume of distilled water for 1 day. The solution is frozen and dried from the frozen state to give a white fluffy solid comprising crude polysaccharide II containing 94,500 mouse protective units per milligram.

Purification of polysaccharide II can be carried out by carbon chromatography. A suspension of 497 mg. of crude polysaccharide II containing 94,500 mouse protective units per milligram, as described, is suspended in 10 ml. of water and insoluble material removed by centrifugation. The precipitate is washed twice with 5 ml. portions of water and all aqueous solutions are combined and adjusted to pH 4.5 with dilute acetic acid. The aqueous solution is diluted to 40 ml. with water and passed through a carbon chromatography column prepared from 650 mg. of activated carbon and 650 mg. of diatomaceous earth. Materials such as Norite and Celite 545 can be used. The column is washed with a small quantity of water and a total of approximately 43 ml. of effluent is collected. The effluent, which shows no absorption maxima in the ultraviolet, is then dialyzed overnight against deionized water and dried from the frozen state to yield 176 mg. of white powder comprising partially purified polysaccharide II assaying for 163,000 mouse protective units per milligram. For further purification, a second carbon chromatography column is prepared from 1.0 g. of activated carbon and 1.0 g. of diatomaceous earth. Materials such as Darco G–60 and Celite 545 can be used. The column is washed with 100 ml. of a 0.2% solution of ethylenediaminetetraacetic acid tetrasodium salt and then with water until neutral. The partially purified polysaccharide II obtained from the previous column (174 mg.) is dissolved in 15 ml. of water and the pH adjusted to 4.1 with acetic acid. The solution is then passed through the carbon column and the column is washed with a small amount of water. The total effluent is collected, adjusted to pH 5.8–6.0 with alkali and dialyzed overnight against deionized water. The remaining solution, having a pH of about 4.5, is filtered through diatomaceous earth and dried from the frozen state to yield purified polysaccharide II containing about 300,000 mouse protective units per milligram. As thus obtained, the product is a mixed calcium-sodium salt. The product shows no selective absorption in the ultraviolet and contains no protein as shown by a negative biuret test and quantitative protein assay. The specific rotation, $[\alpha]_D^{23} = -72.3°$ (0.526% in water) or $[\alpha]_D^{23} = -83°$ calculated for anhydrous form after volatile loss of 13.2% at 50° C. The product assays for: 39.86% carbon, 6.29% hydrogen, 7.47, 7.30% nitrogen, 2.0% calcium, 0.47% sodium, trace of phosphorus and 5.55% ash.

Purification of polysaccharide II can also be carried out via formation of an insoluble quaternary ammonium complex. 100 mg. of crude polysaccharide II assaying for 94,500 mouse protective units per millgram, as described, is dissolved in 5 ml. of water and the solution is clarified by centrifugation. The solution is adjusted to a volume of 11 ml. and a pH of 4.4 with acetic acid and stirred with 52 mg. of activated carbon (Norite) for 10 minutes and then filtered. The filtrate is examined by ultraviolet spectroscopy to determine completeness of nucleic acid removal, and additional treatments with activated carbon are carried out until the filtrate shows substantially no selective absorption in the ultraviolet. Typically, two additional treatments with 50 mg. and 30 mg. quantities of activated carbon are required, and the final filtrate upon lyophilization affords 63 mg. of partially purified polysaccharide II assaying 126,000 mouse protective units per milligram. To a solution of 60 mg. of this powder in 5 ml. of water and 0.9 ml. of 1-normal sodium chloride solution is added 8 ml. of a 1% cetyl pyridinium chloride solution. A viscous oily product separates. The mixture is allowed to stand at room temperature overnight and then centrifuged. The product collected is washed twice by centrifugation with 1 ml. portions of water and dissolved in 1 ml. of 0.5-molar calcium chloride solution. Ethanol (4 to 10 volumes) is added and the calcium salt which precipitates is collected and washed three times with ethanol. The product is redissolved in 1 ml. of water containing 0.05 ml. of the calcium chloride solution, reprecipitated with ethanol, collected and washed three times with ethanol. The product obtained in this manner is polysaccharide II calcium salt assaying for 239,000 mouse protective units per milligram. Some phosphorylated acidic polysaccharides remain in this sample.

Purification of polysaccharide II can also be carried out by the precipitation of impurities with an alcohol. 590 mg. of crude polysaccharide II assaying for 52% purity by colorimetric assay is dissolved in 55 ml. of 0.15-molar sodium sulfate solution. Absolute ethanol (165 ml.) is added dropwise with stirring and the insoluble precipitate which separates is removed by centrifugation, washed with 5–10 ml. of 95% ethanol and discarded. The supernatant liquid, including the ethanol wash, is diluted with an additional 110 ml. of ethanol and centrifuged. A small amount of an insoluble impurity is removed and the supernatant liquid is concentrated in vacuo to a volume of about 15–20 ml., diluted to 50 ml. with water and dialyzed against deionized water overnight. The remaining solution is filtered through diatomaceous earth and lyophilized to yield 307 mg. of polysaccharide II (mixed calcium-sodium salt) as a white powder assaying for 100% purity by colorimetric assay.

In the procedures of this example, one can also use, in place of the UC76 strain of *Staphylococcus aureus*, any of the following strains: Smith, S193N4, H & D, Castellani, MCD 138, SK4473, K6, K93 and K93M.

*Example 4*

300 mg. of the phenol-insoluble, water-insoluble solid material resulting from the extraction of the UC76 strain of *Staphylococcus aureus* with phenol and water is stirred with 10 ml. of 5% trichloroacetic acid for 24 hours at room temperature. The resulting suspension is clarified by centrifugation and filtration through diatomaceous earth and the filtrate is neutralized with alkali, dialyzed, filtered and lyophilized to yield crude polysaccharide II as a white powder assaying for 20% purity by colorimetric assay and bioassay. The product is purified as described in Example 3.

As starting material, one can also use the phenol-insoluble residue resulting from the extraction of the UC76 strain of *Staphylococcus aureus* with phenol.

*Example 5*

316 mg. of the phenol-insoluble, water-insoluble solid material resulting from the extraction of the UC76 strain of *Staphylococcus aureus* with phenol and water is suspended in 20 ml. of 1 normal acetic acid and the mixture is heated under reflux with stirring for 30 minutes. The resulting suspension is clarified by centrifugation and filtration through diatomaceous earth and the filtrate is neutralized with alkali, dialyzed, filtered and lyophilized to yield crude polysaccharide II assaying for 26% purity by colorimetric assay. The product is purified as described in Example 3.

In the foregoing procedure, it is also satisfactory to heat the suspension in 1 normal acetic acid for 45 minutes at 90–95° C.

*Example 6*

A wet paste of "killed" cells prepared by treating a culture of the UC76 strain of *Staphylococcus aureus* with 1% phenol (weight/volume) for 18 hours at room temperature is suspended in distilled water to give a suspension having a cell count of $200 \times 10^9$ cells per ml. The suspension is divided into three portions each having a volume of 170 ml.

The first portion is treated with acetic acid to give a final concentration of 0.1 normal acetic acid (pH about 4.0–4.2) and heated under pressure for 30 minutes at 121° C. The suspension is cooled and centrifuged at 8000 r.p.m. The clear supernatant liquid contains polysaccharide II and assays for 1.53 mg./ml. by colorimetric assay.

The second portion is treated with acetic acid to give a final concentration of 1 normal acetic acid (pH about 3.3) and heated under pressure for 30 minutes at 121° C. The suspension is cooled and centrifuged at 8000 r.p.m. The clear supernatant liquid contains polysaccharide II and assays for 1.66 mg./ml. by colorimetric assay.

The third portion is treated with trichloroacetic acid to give a final concentration of 1 normal trichloroacetic acid (pH about 0.6) and stirred for 16 hours at 23° C. The suspension is then centrifuged at 8000 r.p.m. The clear supernatant liquid contains polysaccharide II and assays for 1.28 mg./ml. by colorimetric assay.

Polysaccharide II obtained in aqueous solution according to any of the foregoing procedures is purified as described in Example 3.

*Example 7*

An aqueous extract (1280 ml.) obtained by phenol-water extraction of the UC76 and K93M strains of *Staphylococcus aureus* and containing polysaccharide I is acidified to a pH of approximately 3.3 with 12.8 ml. of 10 normal acetic acid. The solution is autoclaved for 5 minutes at 121° C. and then cooled to room temperature. The pH is adjusted to approximately 7.0 by the addition of 7.3 ml. of 50% sodium hydroxide solution. This solution, now containing polysaccharide II, assays for 10,500 mouse protective units per ml. It is concentrated in vacuo to a volume of 250 ml. and dialyzed overnight. The solution remaining is filtered and lyophilized to yield polysaccharide II assaying 12% purity by colorimetric assay. 374 mg. of this product is dissolved in 16 ml. of 0.45-molar sodium sulfate solution. 16 ml. of water and then a solution of 278 mg. of cetyl pyridinium chloride in 16 ml. of water are added. The product which precipitates is removed by filtration and the filtrate is lyophilized. The solid obtained from lyophilization is dissolved in 6.2 ml. of water and 31 ml. of absolute ethanol is added dropwise with stirring. The precipitated product is removed by centrifugation and the residue washed with 25 ml. of 95% ethanol in three portions. The ethanol solutions are combined and evaporated in vacuo to a light brown syrup. Absolute ethanol is added to precipitate solid polysaccharide II which is collected by centrifugation, washed with absolute ethanol and dried in vacuo; 82 mg. assaying 48% purity by colorimetric assay.

80 mg. of this product is dissolved in 1 ml. of 1-molar sodium acetate buffer at pH 5.6 and 9 ml. of absolute ethanol is slowly added with stirring. The insoluble product is collected by centrifugation and washed three times with 95% ethanol. The product is dissolved in water, dialyzed overnight and lyophilized. It is again dissolved in 8 ml. of water and the pH adjusted to 4.0. The supernatant liquid is collected after centrifugation and passed through a column prepared from 0.5 g. of activated carbon and 0.5 g. of diatomaceous earth. The column is washed with a small quantity of water and the combined aqueous solution amounting to about 7 ml. is tretaed with 0.6 ml. of 1 normal sodium chloride solution followed by a solution of 45 mg. cetyl pyridinium chloride in 1 ml. of water. The gummy precipitate which separates is removed by centrifugation, washed once with water and dissolved in 0.8 ml. of 1-molar calcium chloride solution. Absolute ethanol (10 volumes) is added and the insoluble product which separates is collected by centrifugation, washed three times with ethanol, redissolved in 1 ml. of water and again precipitated by the addition of ethanol. The product is dissolved in water, dialyzed against distilled water and lyophilized to yield 22 mg. of polysaccharide II (calcium salt) assaying for 92% purity by colorimetric assay. The product is converted to the free acid form by dissolving it in a small quantity of distilled water and passing it through a column containing 2.5 ml. of cation exchange resin in the free acid form. The aqueous solution is lyophilized to yield polysaccharide II (free acid) assaying for 100% purity by colorimetric assay and a viscosity of 0.0159 (0.316% in water).

*Example 8*

Polysaccharide I can be obtained as the free acid by subjecting a salt thereof to ion interchange. 40 mg. of the polysaccharide calcium salt is dissolved in 5 ml. of distilled water. The solution is passed through a column containing 3.5 ml. of cation exchange resin (50–100 mesh) in the free acid form. A resin such as Dowex-50W X8 is suitable. The column is rinsed with 10 ml. of distilled water and the combined effluent and washings are lyophilized to give the polysaccharide (free acid) as a white powder; $[\alpha]_D^{23} = -80.2°$ (0.48% in water) or $$[\alpha]_D^{23} = -86.5°$$

calculated for anhydrous form after volatile loss of 7.3% at 50° C. By potentiometric titration in water, the $pK'_a$ is 3.8. The viscosity is 0.0198 poise (0.3166% in water). The dried product assays for: 44.17% carbon, 6.43% hydrogen, 7.88% nitrogen and 41.52% oxygen by difference, after correcting for 0.53% trace impurity of ash. The indicated empirical formula is $C_{19}H_{33}N_3O_{13}$. Polysaccharide I in the free acid form shows the following infrared absorption maxima in a potassium bromide disk (micro determination): 2.97, 3.22, 3.40, 5.78, 6.08, 6.41, 6.47, 7.02, 7.28, 7.64, 8.09, 8.85, 9.49, 10.83, 11.13 and 11.52 microns.

In the foregoing procedure, the mixed calcium-sodium salt can be used in place of the calcium salt if desired. The mixed calcium-sodium salt is the product obtained following carbon chromatography without quaternary ammonium complex formation.

Polysaccharide I free acid is converted to any desired salt form by titration with a selected base such as sodium hydroxide, potassium carbonate or calcium hydroxide.

*Example 9*

Purified polysaccharide II isolated from carbon chromatography as in Example 3 is obtained as a mixed calcium-sodium salt and is converted to the calcium salt by the following procedure. The polysaccharide (177 mg.) is dissolved in 8 ml. of water and the pH is adjusted to 7.0 with base. To this solution is added 1.8 ml. of 1-molar sodium chloride solution and then 260 mg. of cetyl pyridinium chloride in 8 ml. of water. The mixture is diluted to 30 ml. with water and allowed to stand 1 hour at room temperature, after which the gummy precipitate which has formed is collected by centrifugation and washed once with 4 ml. of water. The precipitate is allowed to drain and then dissolved by stirring it with 5 ml. of 0.5-molar calcium chloride solution. Ethanol (40 ml.) is added and the polysaccharide calcium salt which precipitates is collected by centrifugation and washed three times with ethanol. To obtain a more highly purified calcium salt, the product is dissolved in 5 ml. of water containing 0.1 ml. of 0.5-molar calcium chloride solution and re-precipitated by the addition of 40 ml. of ethanol. The product is collected by centrifugation, washed twice with ethanol, redissolved in water and the solution dialyzed against deionized water for 16 hours. The solution containing the polysaccharide calcium salt is filtered through a pad of diatomaceous earth and the filtrate is lyophilized to give the purified polysaccharide calcium salt as a hydrate; $[\alpha]_D^{23} = -80.8°$ (0.6% in water), or $$[\alpha]_D = -90.6°$$

calculated for anhydrous form after volatile loss of 10.92% at 50° C. The dried product assays for: 40.8% carbon, 6.0% hydrogen, 7.77% nitrogen, 4.83% calcium (by flame) and 6.2% ash. By potentiometric titration in water, the $pK'_a$ is 3.35 corresponding to an equivalent weight of about 600; recomputed to correct for calcium and volatile loss, the equivalent weight of the polysaccharide as the free acid is about 510. In a potassium bromide disk the calcium salt shows infrared absorption maxima at about 2.93, 3.23, 3.41, 5.78, 6.06, 6.42, 6.70, 7.06, 7.27, 7.65, 8.02, 8.78, 9.50, 10.70, 11.20 and 11.55 microns.

*Example 10*

Purified polysaccharide II isolated from carbon chromatography as in Example 3 is obtained as a mixed calcium-sodium salt and is converted to the sodium salt by the following procedure. The polysaccharide (100 mg.) is dissolved in 10 ml. of water and 1.8 ml. of 1-molar sodium chloride solution and then 150 mg. of cetyl pyridinium chloride in 10 ml. of water are added with stirring. After standing at room temperature for 2 hours the precipitated product is collected by centrifugation and washed with 3 ml. of water. The product is redissolved in 2 ml. of 1-molar sodium acetate buffer (pH 5.6). The solution is diluted with 1 ml. of water and then 30 ml. of absolute ethanol is added dropwise, with stirring and warming, to precipitate the polysaccharide sodium salt. The mixture is cooled to room temperature and the product is collected by centrifugation and washed three times with ethanol. To obtain a more highly purified sodium salt, the product is redissolved in 3 ml. of water containing 0.5 ml. of sodium acetate buffer and re-precipitated by the addition of 30–35 ml. of ethanol as before. The insoluble salt is collected in a centrifuge, washed with ethanol, redissolved in water and the solution dialyzed against deionized water for 16 hours. The solution remaining after dialysis is filtered through a pad of diatomaceous earth and the filtrate is lyophilized to give the polysaccharide sodium salt; $[\alpha]_D^{23} = -80.4°$ (0.69% in water), or $$[\alpha]_D^{23} = -86.5°$$

calculated for anhydrous form after volatile loss of 7.35% at 50° C. The dried product assays for: 42.37% carbon, 5.86% hydrogen, 8.32% nitrogen, 3.5% sodium (by flame), 0.35% calcium (trace impurity, by flame) and 7.93% ash. In a potassium bromide disk the sodium salt shows infrared adsorption maxima at about 2.93, 3.24, 3.41, 5.78, 6.05, 6.43, 6.70, 7.10, 7.27, 7.65, 8.02, 8.85, 9.53, 10.70, 11.20 and 11.57 microns.

*Example 11*

Polysaccharide II can be obtained as the free acid by subjecting a salt thereof to ion interchange. A solution of 35 mg. of the polysaccharide calcium salt as obtained in Example 9 in 5 ml. distilled water is passed through a column containing 2.5 ml. of cation exchange resin (50–100 mesh) in the free acid form. A resin such as Dowex-50W X8 is suitable. The column is rinsed with a small amount of distilled water and the combined effluent and washings are lyophilized to give the polysaccharide (free acid) as a white powder; $[\alpha]_D^{23} = -79.4°$ (0.63% in water), dried sample. The product, after drying to constant weight at 50° C., assays for: 44.89% carbon, 6.48% hydrogen, 8.34% nitrogen and 40.3% oxygen by difference. The indicated empirical formula is $C_{19}H_{33}N_3O_{13}$.

Another sample of the polysaccharide free acid prepared from the mixed calcium-sodium salt had a specific rotation, $[\alpha]_D^{23} = -77.2°$ (0.5% in water). After drying to constant weight at 50° C. this product assayed for: 44.64% carbon, 6.27% hydrogen, 8.15% nitrogen and 40.9% oxygen by difference. Bioassay showed 313,000 mouse protective units per milligram.

Polysaccharide II in the free acid form shows the following infrared absorption maxima in a potassium bromide disk: 2.95, 3.22, 3.33, 3.37, 5.73, 6.00, 6.43, 6.96, 7.24, 7.61, 8.04, 8.77, 9.49, 10.83, 11.13 and 11.52 microns.

Polysaccharide II free acid is converted to any desired salt form by titration with a selected base such as sodium hydroxide, potassium carbonate or calcium hydroxide.

*Example 12*

A culture medium containing the following constituents in aqueous solution is prepared.

| Ingredient: | Percent (weight/volume) |
|---|---|
| Pancreatic digest of casein | 1.5 |
| Autolyzed brewers' yeast fraction | 0.5 |
| Glucose monohydrate | 0.75 |
| Dipotassium phosphate | 0.5 |
| Sodium chloride | 0.5 |

For use, this medium is sterilized at 120–125° C. for 30 minutes, with an antifoaming agent consisting of a mixture of crude lard and mineral oils containing mono- and diglycerides being added as required.

600 ml. of the above described culture medium is inoculated with the UC76 strain of *Staphylococcus aureus* and shaken at 35–37° C. for 8–24 hours at 200 revolutions per minute. If found to be satisfactory in growth and microscopic purity, this culture is inoculated into 30 liters of the above described medium and the culture is grown for 6–12 hours at 35–37° C. with an air flow of 1–2 volumes of air per volume of medium per minute, without other mechanical agitation. When the growth is determined to be satisfactory, the 30-liter culture is inoculated into 600 liters of the above described medium and the organism is grown for 6–12 hours at 26–37° C. (preferably about 32° C.) with an air flow of 0.75–1.5 volumes of air per volume of medium per minute without other mechanical agitation. By means of a steam jacket or direct steam injection, the temperature of the culture is then raised to 100±2° C. and held at that temperature for 5 minutes with efficient agitation. The heat-killed culture is cooled rapidly to 40° C., mixed with 3 percent (weight/volume) of diatomaceous earth and filtered through a plate and frame press, precoated with diatomaceous earth. The press cake is washed with deionized water, dried with compressed air, and resuspended in 200 liters of deionized water. Sufficient glacial acetic acid is added to make the suspension 0.1 N acetic acid and the mixture is heated with a steam jacket or direct steam injection to 100±2° C. and held at that temperature for 10 minutes with efficient agitation. The mixture is cooled rapidly to 40° C. and filtered through a plate and frame press. The press cake is washed with deionized water and discarded. The combined filtrate and washing is adjusted to pH 6.0±0.2 with 10 N sodium hydroxide and concentrated under vacuum at a temperature not exceeding 35° C. to a volume of about 6 liters. The concentrate is sampled for polysaccharide content by colorimetric assay. The concentrate is clarified by vacuum filtration through analytical grade diatomaceous earth and the filtrate is placed in dialysis tubing and dialyzed against deionized water for 3 days, the water temperature being maintained at 15±5° C. The dialysate is sampled for polysaccharide content and purity by colorimetric assay. The dialysate is then adjusted to pH 4.0–4.3 with glacial acetic acid and filtered through a two-layer pad of activated carbon (Darco G60) over an equal weight of analytical grade diatomaceous earth. Approximately 4–8 g. of activated carbon is used per gram of polysaccharide is determined by colorimetric assay. The filtrate is adjusted to pH 6.0±0.2 with 10 N sodium hydroxide. The product is a solution of bulk purified polysaccharide, substantially identical with polysaccharide II as previously described. The polysaccharide content is determined by colorimetric assay and bioassay.

If further purification is desired, the concentrated polysaccharide solution is dialyzed against deionized water with agitation for 24 hours and lyophilized to give a mixed calcium-sodium salt assaying for 80–90 percent purity by colorimetric assay and bioassay. 1.84 g. of this mixed salt is dissolved in 370 ml. of 0.15 M sodium sulfate solution and 1110 ml. of absolute ethanol is added dropwise with stirring. The insoluble product is removed by filtration through diatomaceous earth and the filtrate is diluted with an additional 740 ml. of absolute ethanol. A small amount of insoluble material is removed by filtration and the filtrate is concentrated in vacuo to a final volume of 15–20 ml. 25 ml. of absolute ethanol and 150 ml. of acetone are then added and the polysaccharide which precipitates at this point is collected on a filter, washed with acetone, dissolved in water, and the solution dialyzed for 18 hours. Following dialysis, the bag contents are passed through a 2 x 28 cm. column containing cation exchange resin in the free acid form. (Dowex 50 X-8 can be used.) The effluent is shell frozen and lyophilized to afford purified polysaccharide in the free acid form. In a representative preparation, the following analytical and physical measurements were determined. The product assayed for 44.76%, 44.54% carbon; 6.02%, 6.17% hydrogen; 8.15%, 8.23% nitrogen; 0.30% ash; 0.01% (trace amount) phosphorus. Heated for two weeks at 100° C., the volatile loss was 8.79%. Observed specific rotations were $[\alpha]_D^{23}=-91°$ (1% in 0.1 M phosphate buffer at pH 7.0) and $[\alpha]_D^{23}=-84.4°$ (0.3% in water). The $pK'_a$ was determined as 3.3 in water corresponding to an equivalent weight of approximately 503.

The following viscosity measurements were made, the values being given in poises:

$\eta=0.01878$ (0.302% in water)
$\eta=0.01521$ (0.151% in water)
$\eta=0.01305$ (0.075% in water)
$\eta=0.01701$ (0.317% in pH 7 buffer)
$\eta=0.01327$ (0.158% in pH 7 buffer)
$\eta=0.01144$ (0.079% in pH 7 buffer)

The intrinsic viscosity $[\eta]$ was determined as 1.60 in 0.1 M phosphate buffer, pH 7.0, at 25° C.

*Example 13*

Purified polysaccharide I can be obtained from crude aqueous solutions by the following procedure. An aqueous solution of polysaccharide as obtained following phenol-water extraction is concentrated, dialyzed, filtered and lyophilized to give a product of about 20% purity. 10 grams of such a product is dissolved in 300 ml. of 0.15 M sodium sulfate solution and the solution is diluted with another 100 ml. of 0.15 M sodium sulfate solution to which 1200 ml. of absolute ethanol was added. The precipitate is removed by filtration through diatomaceous earth and an additional 1200 ml. of ethanol is added to the filtrate. Insoluble material is removed by filtration and the filtrate is concentrated in vacuo, dialyzed and lyophilized to give a polysaccharide product assaying 74% pure by colorimetric assay. This product (2.4 g.) is dissolved in 250 ml. of water and the pH adjusted to 4.0. The solution is filtered through a two-layer pad of 5.6 g. of activated carbon (Darco G60) over 5.6 g. of diatomaceous earth. The filtrate is combined with 40 ml. of wash water, adjusted to a pH of 6.1 with sodium bicarbonate, dialyzed and lyophilized to give a polysaccharide product assaying 79% pure by colorimetric assay. This product (1.68 g.) is dissolved in 265 ml. of 0.15 M sodium sulfate and 80 ml. of absolute ethanol is added dropwise with stirring. The mixture is filtered through diatomaceous earth to remove insoluble material and an additional 530 ml. of ethanol is added to the filtrate. Insoluble material is again removed by filtration and the filtrate is concentrated in vacuo and dialyzed against deionized water. The contents of the dialysis bag are then passed through a 100 ml. column of cation exchange resin in the free acid form. The effluent is lyophilized to give purified polysaccharide I in the free acid form. In a representative preparation, the following analytical and physical measurements were determined. The product assayed for 45.28% carbon; 6.13% hydrogen; 8.52% nitrogen; 0.20% ash. The volatile loss at 100° C. was 3.82%. The observed specific rotation was $$[\alpha]_D^{23} = -90.5°$$

(1% in pH 7 phosphate buffer).

The following viscosity measurements were made, the values being given in poises:

$\eta = 0.02259$ (0.30% in water)
$\eta = 0.01799$ (0.219% in pH 7 buffer)
$\eta = 0.01360$ (0.108% in pH 7 buffer)
$\eta = 0.01158$ (0.0548% in pH 7 buffer)

The intrinsic viscosity $[\eta]$ was determined as 1.97 in 0.1 M phosphate buffer, pH 7.0, at 25° C.

Example 14

A polysaccharide product substantially identical with polysaccharide I and polysaccharide II but of somewhat higher molecular weight (that is, having a higher state of polymerization) is obtained as follows. Staphylococcal cells are killed with 1% phenol and separated by centrifugation. A mixture is prepared by suspending 637 g. of the wet cell paste in 2 liters of 5% aqueous trichloroacetic acid. The mixture is stirred at room temperature for 24 hours and the cell residue is separated by centrifugation (12,000×G) and washed with water. The aqueous solution is filtered through diatomaceous earth, dialyzed with agitation against tap water for two days, concentrated in vacuo to 1100 ml. and adjusted to pH 4.2 with acetic acid. Colorimetric assay at this point indicates a total of 3.7 g. of polysaccharide. The solution is filtered through a two-layer pad of 26 g. of activated carbon (Darco G60) over 26 g. of diatomaceous earth. The filtrate is adjusted to pH 6.8–7.2 with sodium bicarbonate solution, dialyzed overnight against deionized water and lyophilized to give a product assaying 41% pure by colorimetric assay. This product (7.75 g.) is dissolved in 700 ml. of 0.15 M sodium sulfate solution, and 2800 ml. of absolute ethanol is added with stirring. The precipitate is removed by filtration through diatomaceous earth and washed with 50 ml. of 95% ethanol. The combined filtrate and washing is diluted with an additional 1400 ml. of absolute ethanol and the mixture is again filtered through diatomaceous earth. The filtrate is concentrated in vacuo to a thick syrup to which is added 50 ml. of ethanol followed by 200 ml. of acetone. The insoluble polysaccharide product is collected on a filter, washed with acetone, redissolved in water, and the solution dialyzed against deionized water and filtered through diatomaceous earth. The filtrate is passed through a 100 ml. column of cation exchange resin in the free acid form. The effluent is lyophilized to give purified polysaccharide in the free acid form, substantially identical with polysaccharide I and polysaccharide II but in a somewhat higher polymeric state. In a representative preparation, the following analytical and physical measurements were determined. The product assayed for 44.25%, 44.21% carbon; 6.27%, 6.35% hydrogen; 8.57%, 8.46% nitrogen; 0.13% phosphorus; and 0.66% ash. Heated for three days at 100° C., the volatile loss was 5.75%. The observed specific rotation was $$[\alpha]_D^{23} = -89.5°$$

(1% in pH 7 phosphate buffer).

The following viscosity measurements were made, the values being given in poises:

$\eta = 0.02644$ (0.31% in water)
$\eta = 0.01876$ (0.198% in pH 7 buffer)
$\eta = 0.01372$ (0.099% in pH 7 buffer)
$\eta = 0.01163$ (0.050% in pH 7 buffer)

The intrinsic viscosity $[\eta]$ was determined as 3.05 in 0.1 M phosphate buffer, pH 7.0, at 25° C.

Example 15

Five test tubes each containing 5 ml. of a sterile culture broth having the following composition:

| | G. |
|---|---|
| Peptone derived from casein by pancreatic digestion (Trypticase) | 17.0 |
| Papaic digest of soya meal (Phytone) | 3.0 |
| Sodium chloride | 5.0 |
| Dipotassium phosphate | 2.5 |
| Dextrose | 2.5 |
| Distilled water | 1000.0 | were each seeded with one loopful of a stock culture of the UC76 strain of *Staphylococcus aureus* and the tubes incubated at 37° C. under aseptic conditions for six hours. Seven flasks each containing 200 ml. of a sterile solid culture medium having the following composition:

| | G. |
|---|---|
| Peptone derived from casein by pancreatic digestion (Trypticase) | 15.0 |
| Papaic digest of soya meal (Phytone) | 5.0 |
| Sodium chloride | 5.0 |
| Agar | 15.0 |
| Distilled water | 1000.0 | were each seeded with 2 ml. of the live six hour broth culture of UC76 strain of *Staphylococcus aureus* prepared above and then incubated at 37° C. under aseptic conditions for eighteen hours. The live staphylococci in each of the flasks were aseptically washed from the surface of the nutrient medium with sterile physiological saline solution, the washings combined and the suspension centrifuged at 4000 r.p.m. for one hour at room temperature. The supernatant liquid was discarded. The precipitate which consisted of live cells of the UC76 strain of *Staphylococcus aureus* was suspended in sterile physiological saline solution and the suspension diluted with sufficient sterile physiological saline to produce a suspension containing approximately 1 billion organisms per ml. Such dilution end points can be calculated by making an actual cell count on the concentrate or, more preferably, by photometric means. In the latter case, photometric readings are taken on a series of physiological saline suspensions containing a known number of organisms (determined by cell count) and a standard curve prepared plotting cell count per ml. against percent light transmission. In order to prepare a suspension containing a certain number of organisms per ml. one first determines the theoretical percent light transmission of such a suspension from the standard curve. Sufficient physiological saline solution is then added either to the wet cells or to the concentrated suspension to produce a suspension having the theoretical percent light transmission.

250 ml. of the suspension prepared above which contained approximately 1 billion cells of the UC76 strain of *Staphylococcus aureus* per ml. in sterile physiological saline solution was poured into a 500 ml. bottle through a funnel and heated at 60° C. under aseptic conditions for one hour. The heating time was measured from the time that the contents reached 60° C. The resulting vaccine was cooled and a 5 ml. sample removed for sterility testing in fluid thioglycollate medium. This test as well as a subculture prepared from this test medium showed the vaccine to be sterile. Phenol was added to the balance of the vaccine to a concentration of 0.2% (4.9 ml. of a 10% aqueous solution) and the vaccine stored at 4° C. After about five days a 10 ml. sample of the vaccine to which the phenol had been added was removed for sterility testing in 600 ml. of fluid thioglycollate medium followed by subculture in the same medium. These tests also showed the vaccine to be sterile. The pH of the vaccine was adjusted to about 7 with 1 N sodium hydroxide and safety tested. The vaccine was also assayed for potency in albino mice. This assay was carried out as described below.

Six groups each consisting of fifteen albino Webster mice (18–22 g.) were injected subcutaneously with 0.2 ml. of the following concentrations of the vaccine: undiluted, 1 to 5, 1 to 10, 1 to 20, 1 to 40 and 1 to 80. The dilutions were made aseptically with sterile physiological saline. Seven days later each of the mice in the aforementioned groups, as well as those in a non-vaccinated control group of thirty mice, were challenged by intraperitoneal injection of 0.5 ml. of a 1 to 10,000 dilution of a live six hour culture of the UC76 strain of Staphylococcus aureus (grown in the broth medium described above) in 5% mucin. The challenge dose contained approximately 100,000 organisms and represented 100 LD50 per mouse, that is, 100 times the amount which would produce death in 50% of the non-vaccinated mice within five days. The mice were observed and four days later the number of survivors counted. All but one of the non-vaccinated control mice died within a day of the challenge and the survivor died two days later. All these mice died from staphylococcal infection. In contrast thereto, the percentage of survivors in the groups of vaccinated mice were as follows: undiluted vaccine group—93%, 1–5 diluted vaccine group—87%, 1–10 diluted vaccine group—93%, 1–20 diluted vaccine group—100%, 1–40 diluted vaccine group—73% and 1–80 diluted vaccine group—53%. The results of this assay showed that 0.2 ml. of a 1 to 80 dilution of the vaccine would protect fifty percent of the mice against the lethal challenge dose. Therefore the protective dilution of the vaccine (PD50), that is, the dilution which will protect 50% of the mice against the challenge of 100 LD50, was 80 per 0.2 ml. or 400 per ml. Expressed in another way, 0.0025 ml. of the vaccine was capable of protecting 50% of the vaccinated mice against the lethal challenge dose.

10.5 ml. quantities of the sterile vaccine were placed in small rubber capped bottles under sterile conditions and used in the vaccination of humans. Fifteen people were vaccinated with this vaccine. The protective antibody titre of each patient was determined prior to vaccination as well as periodically following vaccination. After withdrawal of the blood necessary for determination of the pre-vaccination protective antibody titre, the vaccine was tested for adverse sensitivity reactions by intradermally injecting each patient with 0.1 ml. of the vaccine. No noteworthy immediate or delayed sensitivity reactions were observed. To determine the pre-vaccination protective antibody titres and the various post-vaccination protective antibody titres of each of the patients a blood sample (20 ml. for the pre-vaccination titre and 10 ml. for each of the post-vaccination titres) was collected, and the sample allowed to clot, a measured amount of the serum collected (10 ml. for pre-vaccination titre and 5 ml. for post-vaccination titre) and graded physiological saline dilutions of the serum made for intraperitoneal injection into Carworth Farms No. 1 mice weighing 18 to 22 g. Fifteen mice were used for each dilution of serum tested. All of the mice were injected intraperitoneally with approximately 1,000 LD50 of live UC76 Straphylococcus aureus in 5% mucin. At the same time the test mice in each group received a 0.25 ml. intraperitoneal injection of the serum dilution being tested. Four serum dilutions were used in the assay: 1 to 2560, 1 to 640, 1 to 160 and 1 to 40. At the end of four or five days the number of survivors were counted and the test results expressed in percent survivors. All of the untreated control animals died within twenty-four hours. From the survival data obtained in the assay the dilution which protected 50% of the test mice against the challenge was calculated by the Miller-Tainter method [Proc. Soc. Exp. Biol. Med. 57, 264 et seq. (1944)]. The results can be expressed either in terms of the dilution protecting 50% of the test mice (PD50) or as the reciprocal of this figure. In the present case the latter method was used.

The following tables show the protective antibody titres obtained by the use of the vaccine of this example in the aforementioned fifteen patients. Three different vaccination schedules were employed.

TABLE I.—GROUP A—INITIAL DOSE 0.1 ML. OF VACCINE SUBCUTANEOUSLY WITH A 1 ML. INTRAMUSCULAR BOOSTER DOSE OF VACCINE 9 WEEKS AFTER VACCINATION.

| Person [1] | Pre-vaccination Reciprocal $PD_{50}$ | Time in Weeks Following Vaccination (Results Expressed in Terms of Reciprocal $PD_{50}$ per 0.25 ml. of serum) | | | | | | | | | Maximum Fold Increase in Antibody Titre |
|---|---|---|---|---|---|---|---|---|---|---|---|
| | | 1 | 2 | 3 | 4 | 9 [2] | 10 | 11 | 12 | 13 | |
| J | 3 | 5 | 10 | 10 | 4 | 9 | 18 | 9 | 10 | 28 | 9 |
| P | 150 | 100 | 200 | 180 | 150 | 300 | 200 | 260 | 310 | 300 | 2 |
| E | 10 | 10 | 10 | 15 | 10 | 16 | 14 | 10 | 8 | 13 | 1.6 |
| P | 5 | 2 | 30 | 15 | 8 | 20 | 20 | 35 | 15 | 18 | 7 |
| | | | | | | | | | | | [3] 4.9 |

[1] One of the five people in this group did not complete the series and the limited data from him are not included.
[2] Just prior to 1.0 ml. booster injection.
[3] Average.

TABLE II.—GROUP B—INITIAL DOSE 1.0 ML. OF VACCINE INTRAMUSCULARLY WITH 1.0 ML. INTRAMUSCULAR BOOSTER DOSE OF VACCINE 9 WEEKS LATER

| Person | Pre-vaccination Reciprocal $PD_{50}$ | Time in Weeks Following Vaccination (Results Expressed in Terms of Reciprocal $PD_{50}$ per 0.25 ml. of serum) | | | | | | | | | Maximum Fold Increase in Antibody Titre |
|---|---|---|---|---|---|---|---|---|---|---|---|
| | | 1 | 2 | 3 | 4 | 9 [1] | 10 | 11 | 12 | 13 | |
| S | 3 | 25 | 33 | 19 | 19 | 45 | 30 | 100 | 50 | 5 | 33 |
| A | 50 | 300 | 450 | 500 | 600 | 250 | 800 | 14 | 100 | 300 | 16 |
| C | 15 | 45 | 110 | 70 | 80 | 90 | 120 | 75 | 75 | 140 | 9 |
| S | 5 | 90 | 220 | 250 | 50 | 300 | 50 | 250 | 300 | 170 | 60 |
| G | 20 | 420 | 400 | 400 | 250 | 500 | 400 | 400 | 700 | 300 | 35 |
| | | | | | | | | | | | [2] 28.6 |

[1] Just prior to 1.0 ml. booster injection.
[2] Average.

TABLE III.—GROUP C—INITIAL DOSE 1.0 ML. OF VACCINE INTRAMUSCULARLY FOR FOUR WEEKS AT WEEKLY INTERVALS WITH A 1.0 ML. INTRAMUSCULAR BOOSTER DOSE OF VACCINE 9 WEEKS AFTER THE 4TH INITIAL DOSE.

| Person | Pre-vaccination Reciprocal $PD_{50}$ | Time in Weeks Following Vaccination (4 doses) (Results Expressed in Terms of Reciprocal $PD_{50}$ per 0.25 ml. of serum) | | | | | | | | | Maximum Fold Increase in Antibody Titre |
|---|---|---|---|---|---|---|---|---|---|---|---|
| | | 1 | 2 | 3 | 4 | 9[1] | 10 | 11 | 12 | 13 | |
| S | 4 | 550 | 400 | 200 | 190 | 1,100 | 1,200 | 1,400 | 1,800 | 1,800 | 450 |
| R | 6 | 230 | 330 | 200 | 300 | 200 | 200 | 220 | 240 | 160 | 55 |
| B | 60 | 170 | 170 | 150 | 110 | 70 | 65 | 90 | 90 | 110 | 3 |
| F | 5 | 70 | 110 | 110 | 60 | 40 | 30 | 40 | 50 | 85 | 22 |
| B | <2 | <2 | <2 | <2 | <2 | 7 | 3 | 5 | 5 | <2 | >3 |
| | | | | | | | | | | | [2] 126 |

[1] Just prior to 1.0 ml. booster injection.
[2] Average.

No significant local or systemic reactions were detected during or following vaccination of any of the individuals in the three above groups nor following administration of the booster doses. As will be seen from the tables significant rises in protective antibody titre were obtained through the use of the vaccine. This was particularly true of those individuals receiving an initial dose of 1.0 ml. or more (Groups B and C).

Example 16

Four 8 ml. sterile slant cultures of the solid culture medium described in Example 15 were each inoculated with a stock culture of the Smith strain of *Staphylococcus aureus* and incubated under aseptic conditions at 37° C. for eighteen hours. The live staphylococci were aseptically washed from the surface of the culture media with the minimum amount of sterile physiological saline solution, the washings aseptically combined and the resulting suspension diluted with sterile physiological saline to obtain a suspension containing approximately $4.16 \times 10^9$ cells per ml. (Dilution end point determined photometrically.) The suspension was heated at 60° C. under aseptic conditions for one hour, cooled and thimerosal added to a concentration of 1 to 10,000. The sterility of the vaccine was checked by streaking 0.1 ml. on agar plates and found to be sterile. The vaccine was assayed as described in Example 15 for its ability to produce immunity against the Smith and other strains of *Staphylococcus aureus*.

Forty-five Webster mice weighing 18 to 22 g. were injected subcutaneously with 0.2 ml. of the vaccine. Seven days later the mice were divided into three groups of 15 each. The first group of 15 mice was challenged by intraperitoneal injection of 0.5 ml. of a 1 to 10,000 dilution of a live six hour culture of the UC76 strain of *Staphylococcus aureus* (grown in the broth medium of Example 15) in 5% mucin. This challenge dose represented 100 LD50 per mouse. A control group of 15 non-vaccinated mice was also given the challenge dose. The second group of 15 vaccinated mice was challenged with a 1 to 10,000 dilution of a live six hour culture of the Smith strain of *Staphylococcus aureus* (approximately 100 LD50 per mouse). A control group of 15 non-vaccinated mice was also given this same challenge dose. The third group of 15 vaccinated mice was challenged with a 1 to 10,000 dilution of a live six hour culture of the S193N4 strain of *Staphylococcus aureus* (approximately 100 LD50 per mouse). A control group of 15 non-vaccinated mice was also given this same challenge dose. The mice were observed and the number of survivors at the end of five days determined. The survivor data are given in the following table:

| Group | Challenge Strain | Deaths on days after challenge | | | | | | Percent Survivors |
|---|---|---|---|---|---|---|---|---|
| | | 0 | 1 | 2 | 3 | 4 | Total | |
| Non-vaccinated | UC76 | 0 | 15 | 0 | 0 | 0 | 15 | 0 |
| Vaccinated | UC76 | 0 | 0 | 0 | 0 | 0 | 0 | 100 |
| Non-vaccinated | Smith | 0 | 15 | 0 | 0 | 0 | 15 | 0 |
| Vaccinated | Smith | 0 | 1 | 0 | 0 | 0 | 1 | 93 |
| Non-vaccinated | S193N4 | 0 | 15 | 0 | 0 | 0 | 15 | 0 |
| Vaccinated | S193N4 | 0 | 0 | 2 | 0 | 0 | 2 | 87 |

From the above table it will be seen that this vaccine was not only effective in protecting the vaccinated mice against a massive challenge dose of the Smith strain from which it was prepared but also in protecting the vaccinated mice against massive challenge doses of the UC76 and S193N4 strains of *Staphylococcus aureus*.

Example 17

Two 8 ml. sterile slant cultures of the solid culture medium described in Example 15 were each inoculated with a stock culture of the MCD 138 strain of *Staphylococcus aureus* and incubated at 37° C. under aseptic conditions for eighteen hours. The live staphylococci were aseptically washed from the surface of the media with the minimum amount of sterile physiological saline solution and the combined washings diluted with sterile physiological saline solution to obtain a suspension containing approximately $1 \times 10^9$ cells per ml. The suspension was heated at 60° C. under aseptic conditions for one hour, cooled and phenol added to a final concentration of 0.2%. The vaccine was stored overnight at room temperature and then placed in a refrigerator. A sterility test showed that the vaccine contained living microorganisms. The vaccine was heated at 60° C. under aseptic conditions for one hour, cooled and stored in a refrigerator. The sterility test on the vaccine showed it to be sterile. The potency of the vaccine against massive challenge with various strains of *Staphylococcus aureus* was determined as described below.

800 Carworth Farms No. 1 albino mice (18 to 22 g.) were divided, for inoculation purposes, into eight sets composed of five groups of 20 mice each. The mice in each of the eight number 1 groups were inoculated subcutaneously with 0.2 ml. of a 1 to 10 sterile physiological saline dilution of the vaccine, the mice in each of the eight number 2 groups were inoculated subcutaneously with 0.2 ml. of a 1 to 30 sterile physiological saline dilution of the vaccine, the mice in each of the eight number 3 groups were inoculated subcutaneously with 0.2 ml. of a 1 to 100 sterile physiological saline dilution of the vaccine, the mice in each of the number 4 groups were inoculated subcutaneously with 0.2 ml. of a 1 to 300 sterile physiological saline dilution of the vaccine and the mice in each of the eight number 5 groups injected subcutaneously with a 1 to 1,000 sterile physiological saline dilution of the vaccine. Seven days later each of the mice in set number 1 were challenged by intraperitoneal injection of 10,000 LD50 of live *Staphylococcus aureus*, UC76 strain. The mice in each of the other sets were also challenged by intraperitoneal injection of a 10,000 LD50 dose of different strains of *Staphylococcus aureus* as follows: set 2—Smith, set 3—S193N4, set 4—MCD 138, set 5—H & D, set 6—Castellani, set 7—K6 and set 8—K93. The mice were observed for five days after challenge and the deaths recorded. The percentage survivors of each group of each set were calculated and from these survival figures the PD50 of the vaccine against each of the eight challenge strains was calculated by the aforementioned method of Miller and Tainter. The results of the assay are set forth in the following table:

below. It will be seen that in each case the vaccine produced good immunity against the massive doses of the challenge strains.

| Strain Used to Prepare Vaccine | $PD_{50}$ per ml. Against 10,000 $LD_{50}$ of the Challenge Strain | | | | | | | |
|---|---|---|---|---|---|---|---|---|
| | UC76 | Smith | S193N4 | MCD138 | H & D | Castellani | K6 | K93 |
| UC76 | 40 | 250 | 50 | 100 | 125 | 150 | 250 | 275 |
| Smith | 75 | 90 | 25 | 80 | 100 | 80 | 200 | 90 |
| S193N4 | 200 | 250 | 120 | 140 | 350 | 375 | 550 | 375 |
| H & D | 150 | 100 | 175 | 60 | 25 | 510 | 250 | 150 |
| Castellani | 125 | 225 | 140 | 250 | 225 | 600 | 250 | 375 |
| K6 | 65 | 200 | 75 | 50 | 150 | 500 | 85 | 110 |
| K93 | 20 | 165 | 125 | 75 | 75 | 400 | 150 | 350 |

*Example 18*

Two 8 ml. sterile slant cultures of the solid medium described in Example 15 were each inoculated with a stock culture of the K93M strain of *Staphylococcus aureus* and incubated at 37° C. under aseptic conditions for 18 hours. The live staphylococci were washed from the surface of the media with the minimum amount of sterile physiological saline solution and the combined washings diluted with sterile physiological saline to obtain a suspension containing approximately $1 \times 10^9$ cells per ml. The suspension was heated at 60° C.

| Set No. | Challenge Strain | Group 1 (Vaccine diluted 1 to 10) | | | | | | Group 2 (Vaccine diluted 1 to 30) | | | | | | Group 3 (Vaccine diluted 1 to 100) | | | | | |
|---|---|---|---|---|---|---|---|---|---|---|---|---|---|---|---|---|---|---|---|
| | | Deaths on days after challenge | | | | | Percent Survivors | Deaths on days after challenge | | | | | Percent Survivors | Deaths on days after challenge | | | | | Percent Survivors |
| | | 0 | 1 | 2 | 3 | 4 | | 0 | 1 | 2 | 3 | 4 | | 0 | 1 | 2 | 3 | 4 | |
| 1 | UC76 | 0 | 4 | 1 | 1 | 0 | 70 | 0 | 9 | 1 | 0 | 0 | 50 | 0 | 14 | 0 | 1 | 0 | 25 |
| 2 | Smith | 0 | 1 | 0 | 0 | 0 | 95 | 0 | 0 | 0 | 0 | 0 | 100 | 0 | 10 | 0 | 0 | 0 | 50 |
| 3 | S193N4 | 0 | 1 | 1 | 0 | 0 | *89 | 0 | 3 | 3 | 0 | 0 | 70 | 0 | 12 | 1 | 0 | 0 | 35 |
| 4 | MCD138 | 0 | 9 | 0 | 0 | 0 | 55 | 0 | 12 | 0 | 0 | 0 | 40 | 0 | 20 | 0 | 0 | 0 | 0 |
| 5 | H & D | 0 | 3 | 0 | 0 | 0 | 85 | 0 | 2 | 0 | 0 | 0 | 90 | 0 | 12 | 0 | 0 | 0 | 40 |
| 6 | Castellani | 0 | 6 | 0 | 0 | 0 | 70 | 0 | 3 | 1 | 0 | 0 | 80 | 0 | 10 | 0 | 0 | 0 | 50 |
| 7 | K6 | 0 | 1 | 0 | 0 | 0 | 95 | 0 | 2 | 0 | 0 | 0 | 90 | 0 | 5 | 0 | 0 | 0 | 75 |
| 8 | K93 | 0 | 5 | 0 | 0 | 0 | 75 | 0 | 4 | 0 | 0 | 0 | 80 | 0 | 12 | 2 | 0 | 0 | 30 |

*Only 19 mice in group.

| Set No. | Challenge Strain | Group 4 (Vaccine diluted 1 to 300) | | | | | | Group 5 (Vaccine diluted 1 to 1000) | | | | | | $PD_{50}$ per ml. |
|---|---|---|---|---|---|---|---|---|---|---|---|---|---|---|
| | | Deaths on days after challenge | | | | | Percent Survivors | Deaths on days after challenge | | | | | Percent Survivors | |
| | | 0 | 1 | 2 | 3 | 4 | | 0 | 1 | 2 | 3 | 4 | | |
| 1 | UC76 | 0 | 20 | 0 | 0 | 0 | 0 | 0 | 20 | 0 | 0 | 0 | 0 | 150 |
| 2 | Smith | 0 | 20 | 0 | 0 | 0 | 0 | 0 | 20 | 0 | 0 | 0 | 0 | 500 |
| 3 | S193N4 | 0 | 19 | 1 | 0 | 0 | 0 | 0 | 20 | 0 | 0 | 0 | 0 | 300 |
| 4 | MCD138 | 0 | 19 | 0 | 0 | 0 | 5 | 0 | 18 | 0 | 0 | 0 | 5 | 95 |
| 5 | H & D | 0 | 16 | 0 | 0 | 0 | 20 | 0 | 20 | 0 | 0 | 0 | 0 | 500 |
| 6 | Castellani | 0 | 20 | 0 | 0 | 0 | 0 | 0 | 20 | 0 | 0 | 0 | 0 | 400 |
| 7 | K6 | 0 | 14 | 0 | 0 | 0 | 30 | 0 | 16 | 0 | 0 | 0 | 20 | 1,150 |
| 8 | K93 | 0 | 16 | 0 | 0 | 0 | 20 | 0 | 17 | 0 | 0 | 0 | 15 | 350 |

As will be seen from the above table the vaccine produced good immunity against each of the eight challenge strains of *Staphylococcus aureus*.

Seven vaccines were prepared by the above described procedure using the following strains of *Staphylococcus aureus*: UC76, Smith, S193N4, H & D, Castellani, K6 and K93. After testing for sterility, the potency of each of these seven vaccines was determined in exactly the same manner as that described above for the vaccine prepared from the MCD 138 strain. The results of these tests expressed in terms of PD50 per ml. are shown in the table under aseptic conditions for one hour, cooled and phenol added to a concentration of 0.2%. The vaccine was stored overnight at room temperature and then placed in a refrigerator. The vaccine was tested for sterility. The sterility test showed the vaccine to be sterile. The vaccine was assayed for potency in Carworth Farms No. 1 mice by the procedure described in Example 17 and found to possess a PD50 per ml. of 1900 against 10,000 LD50 of the K93M strain of *Staphylococcus aureus* and a PD50 per ml. of 700 against 10,000 LD50 of the K93 strain of *Staphylococcus aureus*.

We claim:
1. Process for the production of a staphylococcal vaccine product which comprises extracting the intact cells of a strain of *Staphylococcus aureus* selected from the class consisting of the UC76, Smith, NRRL B–2469, NRRL B–2471, NRRL B–2472, NRRL B–2473, NRRL B–2474, NRRL B–2475, NRRL B–2476, and NRRL B–2477 strains and identifiable by the property of forming loosely cohesive, diffuse, semi-opaque colonies when grown in a semi-solid or soft agar culture medium containing plasma, serum or protein components thereof; with phenol containing up to 30 percent water and an aqueous solvent to obtain immiscible phenolic and aqueous solutions, and separating the phenolic solution and insoluble solid material from the aqueous solution; said aqueous solution being capable of stimulating the production of a protective antibody against *Staphylococcus aureus*.

2. Process for the production of a staphylococcal vaccine product which comprises extracting the intact cells of the UC76 strain of *Staphylococcus aureus* simultaneously with phenol containing up to 30 percent water and water to obtain immiscible phenolic and aqueous solutions, and separating the phenolic solution and insoluble solid material from the aqueous solution; said aqueous solution being capable of stimulating the formation of a protective antibody against *Staphylococcus aureus*.

3. Process for the production of a staphylococcal vaccine product which comprises extracting the intact cells of the UC76 strain of *Staphylococcus aureus* with phenol containing between 5 and 30 percent water, separating the insoluble solid material from the phenol and extracting the insoluble solid material with water to obtain an aqueous solution capable of stimulating the formation of a protective antibody against *Staphylococcus aureus*.

4. Process for the production of a staphylococcal vaccine product which comprises reacting immunogenic protoplasmic material from a strain of *Staphylococcus aureus* selected from the class consisting of the UC76, Smith, NRRL B–2469, NRRL B–2471, NRRL B–2472, NRRL B–2473, NRRL B–2474, NRRL B–2475, NRRL B–2476, and NRRL B–2477 strains and identifiable by the property of forming loosely cohesive, diffuse, semi-opaque colonies when grown in a semi-solid or soft agar culture medium containing plasma, serum or protein components thereof; with an aqueous acid at a pH of approximately 4 or lower to obtain an aqueous solution, and separating the aqueous solution from insoluble solid material; said aqueous solution upon adjustment to a pH acceptable for injection being capable of stimulating the formation of a protective antibody against *Staphylococcus aureus*.

5. Process according to claim 4 wherein the immunogenic protoplasmic material is the phenol-insoluble, water-insoluble solid material resulting from extraction of the organism with phenol and an aqueous solvent.

6. Process according to claim 4 wherein the immunogenic protoplasmic material is the intact cells of the organism.

7. Process according to claim 4 wherein the aqueous acid is dilute acetic acid.

8. Process according to claim 4 wherein the aqueous acid is dilute trichloroacetic acid.

9. Process according to claim 4 wherein the pH of the aqueous solution is adjusted to between about 6 and 8; said aqueous solution thereupon being usable as a vaccine product for parenteral administration.

10. Process for the production of a staphylococcal vaccine product which comprises heating the intact cells of the UC76 strain of *Staphylococcus aureus* with 0.1-normal acetic acid for 10 minutes at about 100° C. to obtain an aqueous solution, and separating the aqueous solution from insoluble solid material; said aqueous solution upon adjustment to a pH acceptable for injection being capable of stimulating the formation of a protective antibody against *Staphylococcus aureus*.

11. Process according to claim 10 wherein the intact cells are cells which have been killed by heating.

12. A member of the class of antigenic compounds consisting of polysaccharides and salts thereof, said polysaccharides being white, solid, water-soluble, acidic substances which: are heat stable and non-dialyzable; in free acid form contain only the elements carbon, hydrogen, oxygen and nitrogen; when dried to constant weight at 50° C. assay for the empirical formula $C_{19}H_{33}N_3O_{13}$ and a specific rotation $[\alpha]_D^{23} = -79.4°$ in water; exhibit no selective ultraviolet absorption; in free acid form exhibit a characteristic infrared absorption spectrum in a potassium bromide disk substantially as shown in the drawing; give negative Molisch and anthrone tests; give negative tests for sialic and common uronic acids; following hydrolysis give a positive Elson-Morgan test; by heating with diphenylamine in acetic acid-sulfuric acid mixture give a product having a blue color with an absorption maximum at 575 millimicrons; by heating in 79% sulfuric acid give a product having an ultraviolet absorption maximum at 290 millimicrons; by heating in acetic acid containing 10% sulfuric acid give a product having absorption maxima at 283, 410 and 470 millimicrons; by electrophoresis at pH values of 4 and above move toward the anode and are detectable by the pink color developed upon spraying with 1% p-anisidine in wet butanol containing 2% sulfuric acid and heating at 100° C. for 10 minutes; and have intrinsic viscosities, measured at 25° C. in 0.1 M phosphate buffer at pH 7, between 0.3 and 3.5, corresponding to molecular weights substantially in excess of 100,000.

13. Polysaccharide as defined in claim 12, in free acid form.

14. Product according to claim 13 wherein the intrinsic viscosity, measured at 25° C. in 0.1 M phosphate buffer at pH 7, is 1.60.

15. Product according to claim 13 wherein the intrinsic viscosity, measured at 25° C. in 0.1 M phosphate buffer at pH 7, is 1.97.

16. Product according to claim 13 wherein the intrinsic viscosity, measured at 25° C. in 0.1 M phosphate buffer at pH 7, is 3.05.

17. Polysaccharide as defined in claim 12, in calcium salt form.

18. Process for the purification of a product as defined in claim 12 which comprises passing an aqueous solution of the product through a column of activated carbon and recovering the product from the effluent.

19. Process for the production of a staphylococcal vaccine which comprises heating a suspension of intact live cells of a strain of *Staphylococcus aureus* selected from the class consisting of the UC76, Smith, NRRL B–2469, NRRL B–2471, NRRL B–2472, NRRL B–2473, NRRL B–2474, NRRL B–2475, NRRL B–2476, and NRRL B–2477 strains and identifiable by the property of forming loosely cohesive, diffuse, semi-opaque colonies when grown in a semi-solid or soft agar culture medium containing plasma, serum or protein components thereof; in a sterile aqueous medium at a temperature between 55 and 80° C. under aseptic conditions until the suspension is at least substantially sterile.

20. Process for the production of a staphylococcal vaccine which comprises heating a suspension of intact live cells of the UC76 strain of *Staphylococcus aureus* in sterile physiological saline solution at a temperature of about 60° C. under aseptic conditions for about one hour, said suspension containing about one to four billion staphylococci cells per milliliter.

21. Process for the production of a staphylococcal vaccine which comprises heating a suspension of intact live cells of the NRRL B–2477 strain of *Staphylococcus aureus* in sterile physiological saline solution at a temperature of about 60° C. under aseptic conditions for about one hour, said suspension containing about one to four billion staphylococci cells per milliliter.

22. Process for the production of a staphylococcal vaccine which comprises heating a suspension of intact live cells of the NRRL B-2473 strain of *Staphylococcus aureus* in sterile physiological saline solution at a temperature of about 60° C. under aseptic conditions for about one hour, said suspension containing about one to four billion staphylococci cells per milliliter.

23. Process for the production of a staphylococcal vaccine which comprises heating a suspension of intact live cells of the NRRL B-2469 strain of *Staphylococcus aureus* in sterile physiological saline solution at a temperature of about 60° C. under aseptic conditions for about one hour, said suspension containing about one to four billion staphylococci cells per milliliter.

References Cited by the Examiner

UNITED STATES PATENTS 2,340,318  2/1944  Gerlough _____ 167—78

OTHER REFERENCES

Finkelstein, J. Bacteriology, vol. 75, pp. 339–343 (1958).

Fisher, Antibiotics Annual, 1957–1958, pp. 573–576.

Fisher, J. Immunology, 1958, pp. 29–31.

Fisher, Nature, June 13, 1959, pp. 1692–1693.

Kabet et al.: Experimental Immuno-Chemistry, published by Charles C. Thomas, Springfield, Illinois, 1961, pp. 835–837.

Keogh et al.: Nature, 1948, pp. 687 and 688.

Rountree et al.: Australian Annals of Medicine, 1952, pp. 80–83.

Science, vol. 123, page 64, January 13, 1956.

Zinsser, Bacteriology, published by Apple Century Crofts, New York, 1957, pp. 246–247.

LEWIS GOTTS, *Primary Examiner*.

RICHARD L. HUFF, *Assistant Examiner*.